United States Patent
Rizzolatti

(10) Patent No.: US 11,362,576 B1
(45) Date of Patent: Jun. 14, 2022

(54) POWER CONVERTER WITH MULTIPLE OUTPUT VOLTAGES

(71) Applicant: Infineon Technologies Austria AG, Villach (AT)

(72) Inventor: Roberto Rizzolatti, Villach (AT)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 17/203,551

(22) Filed: Mar. 16, 2021

(51) Int. Cl.
 *H02M 1/00* (2006.01)
 *H02M 3/07* (2006.01)

(52) U.S. Cl.
 CPC ............ *H02M 1/009* (2021.05); *H02M 3/07* (2013.01)

(58) Field of Classification Search
 None
 See application file for complete search history.

(56) References Cited

U.S. PATENT DOCUMENTS

| | | | |
|---|---|---|---|
| 8,929,109 B2* | 1/2015 | Chang | H02M 3/3376 363/71 |
| 10,224,802 B1* | 3/2019 | Chakkirala | H02M 1/08 |
| 10,491,123 B2* | 11/2019 | Wang | H02M 3/3376 |
| 10,615,701 B2* | 4/2020 | Fu | H02M 3/33569 |
| 10,734,905 B2* | 8/2020 | Zhao | H02M 3/158 |

* cited by examiner

*Primary Examiner* — Jeffery S Zweizig
(74) *Attorney, Agent, or Firm* — Armis IP Law, LLC

(57) ABSTRACT

An apparatus such as a power supply system includes a switched-capacitor converter operative to receive an input voltage. The switched-capacitor converter includes multiple resonant circuit paths to convert the input voltage into a first output voltage and a second output voltage. A first output of the switched-capacitor converter is operative to output the first output voltage; a second output of the switched-capacitor converter is operative to output the second output voltage.

33 Claims, 20 Drawing Sheets

POWER CONVERTER WITH MULTIPLE OUTPUT VOLTAGES

BACKGROUND

As its name suggests, a conventional switched-capacitor DC-DC converter converts a received DC input voltage into a DC output voltage.

In one conventional application, the input voltage to the conventional switched-capacitor converter falls in a range between 40 VDC to 60 VDC. In such an instance, switches in the switched-capacitor converter are controlled to transfer charge stored in respective capacitors, resulting in conversion of the input voltage such as a 48 VDC to an output voltage such as 12 VDC for a so-called conventional 4:1 switched-capacitor converter. In other words, a conventional switched-capacitor converter can be configured to convert a 48 VDC voltage into a 12 VDC voltage.

To avoid so-called hard switching in the switched-capacitor converter, the switches in the switched-capacitor converter are preferably switched when there is near zero voltage across them and near zero current flowing through them.

The undesirable hard switching in a conventional switched-capacitor converter may be mitigated by placing an individual inductor in series with a respective capacitor in each stage of the switched-capacitor converter. This results in a resonant (or semi-resonant) switching converter. Such a switched-capacitor converter is sometimes termed a switched tank converter (STC). The resonant tank circuit formed by a series connection of an inductor and capacitor has an associated resonant frequency that is based upon the inductance and capacitance of these components.

One conventional solution in which to produce an output voltage to power a load is implementation of a Dickson charge pump, which is enabling high efficiency and power density converter 2:1, 4:1 and 6:1 unregulated. In certain instances, the Dickson charge pump is a zero-voltage switching switched capacitor converter 4:1, which produces an unregulated voltage output.

BRIEF DESCRIPTION

Implementation of clean energy (or green technology) is very important to reduce our human impact on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator or voltage source.

Regardless of whether energy is received from green energy sources or non-green energy sources, it is desirable to make most efficient use of raw energy (such as storage and subsequent distribution) provided by such sources to reduce our impact on the environment. This disclosure contributes to reducing our carbon footprint and providing better use of energy via more efficient energy conversion.

This disclosure further includes the observation that power conversion efficiency of conventional power supplies can be improved. For example, to this end, embodiments herein include novel ways of providing improved performance of power conversion via implementation of multiple types of novel switched-capacitor converters.

More specifically, according to one embodiment, an apparatus includes a switched-capacitor converter operative to receive an input voltage. The switched-capacitor converter includes multiple resonant circuit paths to convert the input voltage into a first output voltage and a second output voltage. A first output of the switched-capacitor converter is operative to output the first output voltage; a second output of the switched-capacitor converter is operative to output the second output voltage.

In further example embodiments, the switched-capacitor converter includes a controller that regulates a magnitude of the first output voltage. A magnitude of the second output voltage is proportional to the magnitude of the first output voltage and is controlled based, at least in part, on regulation of the first output voltage.

In still further example embodiments, as its name suggests, the switched-capacitor converter includes multiple switches. A controller controls states of the switches in the switched-capacitor converter to draw power from the input voltage for greater than 50% of a duty cycle of controlling the switches in the switched-capacitor converter.

In yet further example embodiments, the switched-capacitor converter includes a transformer. The transformer includes multiple windings to convert the input voltage into the first output voltage and the second output voltage. In one embodiment, a turn ratio associated with the multiple windings in the transformer controls a magnitude of the first output voltage and a magnitude of the second output voltage.

The switched-capacitor converter as discussed herein can be configured to include any number of resonant circuit paths. For example, in one embodiment, the switched-capacitor converter includes a first resonant circuit path and a second resonant circuit path. As previously discussed, the switched-capacitor converter also includes a transformer, the transformer includes a first winding and a second winding. In further example embodiments, the first resonant circuit path includes a first capacitor and the first winding of the transformer; the second resonant circuit path includes a second capacitor and the second winding of the transformer. The first winding is inductively coupled to the second winding.

Still further example embodiments herein include, via a controller: i) switching of a first switch of the switched-capacitor converter to electrically couple a first resonant circuit path and windings of the switched-capacitor converter to the second output, and ii) switching of a second switch of the switched-capacitor converter to electrically couple a second resonant circuit path and windings of the switched-capacitor converter to the second output.

In further example embodiments, the multiple resonant circuit paths of the switched-capacitor converter include a first resonant circuit path and a second resonant circuit path. Both the first resonant circuit path and the second resonant circuit path contribute to generation of the first output voltage; both the first resonant circuit path and the second resonant circuit path contribute to generation of the second output voltage.

As previously discussed, the apparatus as discussed herein can be configured to include a controller. In one embodiment, the controller controls a magnitude of the input voltage inputted to the switched-capacitor converter based on comparison of the first output voltage to a setpoint value.

In still further example embodiments, the controller switches between: i) coupling a node of a first resonant circuit path of the switched-capacitor converter between the input voltage and an output node that produces the second output voltage, and ii) coupling a node of a second resonant circuit path of the switched-capacitor converter between the input voltage and the output node that produces the second output voltage.

Yet further, embodiments herein include an apparatus in which resonant frequencies of the multiple resonant circuit paths are defined by windings in a multi-tapped autotransformer.

Embodiments herein are useful over conventional techniques. For example, in contrast to conventional techniques, the novel power supply or power converter as discussed herein includes a switched-capacitor converter and corresponding multi-winding transformer that collectively provide higher efficiency of converting an input voltage into multiple output voltages. Such an embodiment provides lower loss of energy during generation of respective output voltages.

These and other more specific embodiments are disclosed in more detail below.

Note that any of the resources as discussed herein can include one or more computerized devices, apparatus, hardware, etc., that execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of multiple output voltages to power respective multiple loads. The instructions, when executed by computer processor hardware, cause the computer processor hardware (such as one or more co-located or disparately located processor devices or hardware) to: via controlled switching of multiple resonant circuit paths in a switched-capacitor converter, convert a received input voltage into a first output voltage and a second output voltage; via a first output of the switched-capacitor converter, output the first output voltage; and via a second output of the switched-capacitor converter, output the second output voltage.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a switched-capacitor converter, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
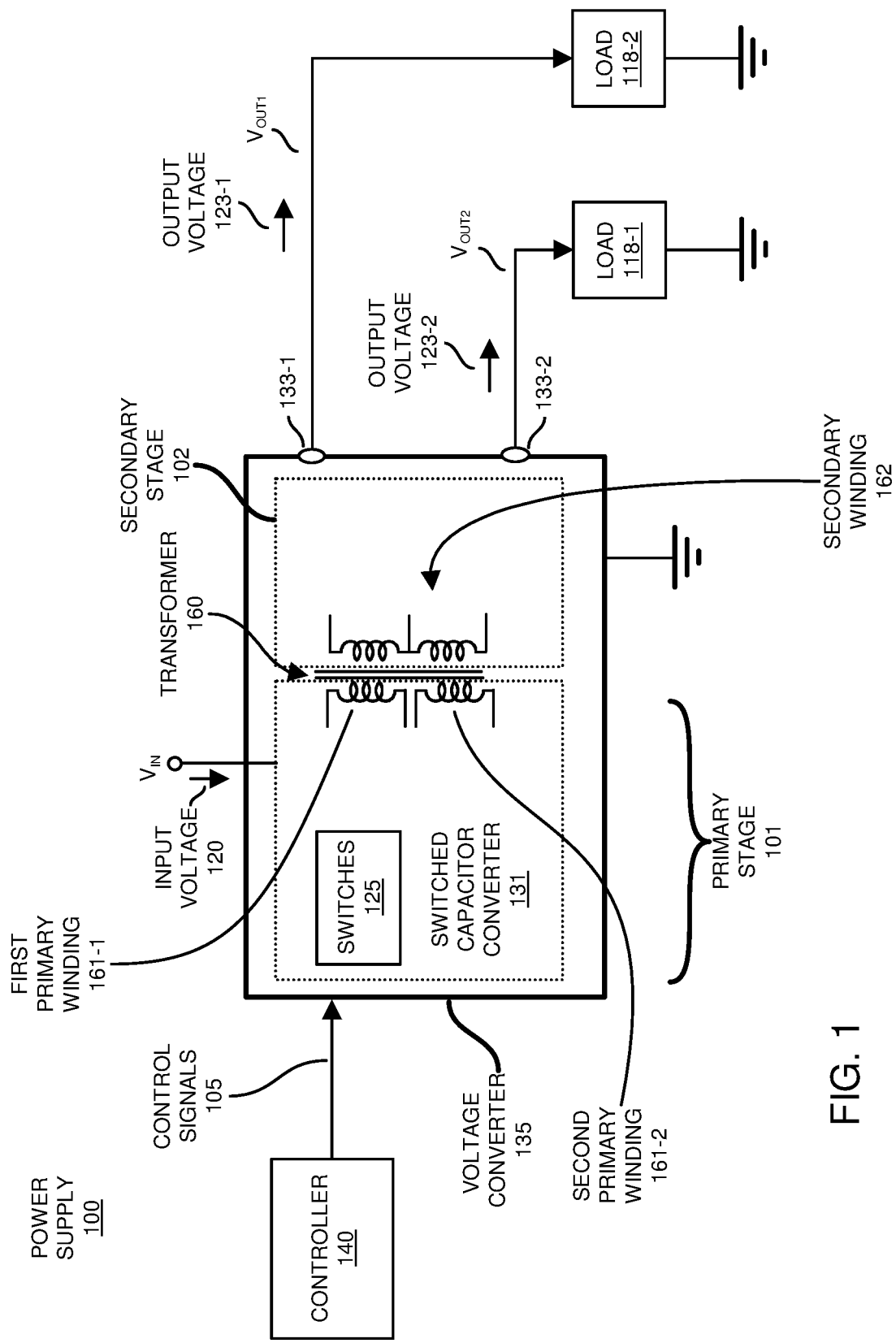
FIG. 1 is an example diagram illustrating a power supply including a switched-capacitor converter and multi-tapped autotransformer operative to produce multiple output voltages according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, an apparatus such as a power supply system includes a switched-capacitor converter operative to receive an input voltage. The switched-capacitor converter includes multiple resonant circuit paths to convert the input voltage into a first output voltage and a second output voltage. A first output of the switched-capacitor converter is operative to output the first output voltage; a second output of the switched-capacitor converter is operative to output the second output voltage.

Now, more specifically, FIG. 1 is an example diagram illustrating a power supply including a switched-capacitor converter and multi-tapped autotransformer operative to produce multiple output voltages according to embodiments herein.

As shown in this example embodiment, power supply 100 (such as an apparatus, electronic device, etc.) includes a controller 140 and voltage converter 135. The voltage converter 135 includes a primary stage 101 (first stage) and a secondary stage 102 (second stage).

Primary stage 101 includes a switched-capacitor converter 131 comprising switches 125, first primary winding 161-1, and second primary winding 161-2 of multi-tapped autotransformer 160. Note that the multi-tapped autotransformer 160 is shown by way of a non-limiting example embodiment and can be instantiated as any suitable device such as a transformer, transformer device, transformer apparatus, etc.

Secondary stage 102 includes secondary winding 162 of multi-tapped autotransformer 160 and related circuitry to generate output voltages 123-1 and 123-2 (such as a generally DC voltages). Secondary winding 162 comprises first secondary winding 162-1 and second secondary winding 162-2.

Note that each of the resources as described herein can be instantiated in a suitable manner. For example, each of the controller 140 can be instantiated as or include hardware (such as circuitry), software (executable instructions), or a combination of hardware and software resources.

During operation, controller 140 produces control signals 105 (such as one or more pulse width modulation signals) that control states of respective control switches 125 in switched-capacitor converter 131.

As further shown, the switched-capacitor converter 131 receives the input voltage 120 (Vin, such as a DC input voltage) supplied to the switched-capacitor converter 131. As previously discussed, the multi-tapped autotransformer 160 includes a first primary winding 161-1 and a second primary winding 161-2. In one embodiment, the primary windings 161 are at least inductively coupled to the secondary winding 162 (which itself is one or more windings).

In accordance with further embodiments, the primary windings 161 are connected in series with the secondary windings 162, although this may vary depending on the embodiment.

As further discussed herein, controller 140 of the power supply 100 controllably switches multiple capacitors and corresponding resonant circuit paths including the primary windings 161 of transformer 160 (such as an multi-tapped autotransformer or other suitable component) to convey energy from the input voltage (Vin) through the primary winding 161 to the secondary winding 162 to produce the output voltage 123-1 and output voltage 123-2.

Accordingly, embodiments herein include an apparatus such as a power supply 100. The apparatus includes a switched-capacitor converter 131 operative to receive an input voltage 120. In one embodiment, the switched-capacitor converter 131 includes multiple resonant circuit paths to convert the input voltage 120 into a first output voltage 123-1 and a second output voltage 123-2. A first output 133-1 of the switched-capacitor converter 131 is operative to output the first output voltage 123-1; a second output 133-2 of the switched-capacitor converter 131 is operative to output the second output voltage 123-2.

In further example embodiments, the power supply 100 includes a controller 140 that controls the voltage converter 135 and regulates a magnitude of the first output voltage 123-1. In one embodiment, as further discussed herein, a magnitude of the second output voltage 123-2 is proportional to the magnitude of the first output voltage 123-1 and is controlled based, at least in part, on regulation of the first output voltage 123-1.

In still further example embodiments, as its name suggests, and as previously discussed, the switched-capacitor converter 131 includes multiple switches 125. The controller 140 controls states of the switches 125 in the switched-capacitor converter to draw power from the input voltage 120 for greater than 50% of a duty cycle of controlling the switches 125 in the switched-capacitor converter 131.

In yet further example embodiments, as previously discussed, the switched-capacitor converter 131 includes a transformer 160. The transformer 160 includes multiple windings to convert the input voltage 120 into the first output voltage 123-1 and the second output voltage 123-2. In one embodiment, a turn ratio associated with the multiple windings (such as winding 161-1, winding 161-2, winding 162, etc.) in the transformer 160 controls a magnitude of the first output voltage 123-1 and a magnitude of the second output voltage 123-2.

Embodiments herein are useful over conventional techniques. For example, in contrast to conventional techniques, the novel power supply or power converter as discussed herein includes a switched-capacitor converter and corresponding multi-winding transformer that collectively provide higher efficiency of converting an input voltage 120 into multiple output voltages 123-1 and 123-2. Such an embodiment provides lower loss of energy during generation of respective output voltages.

Figure 2:
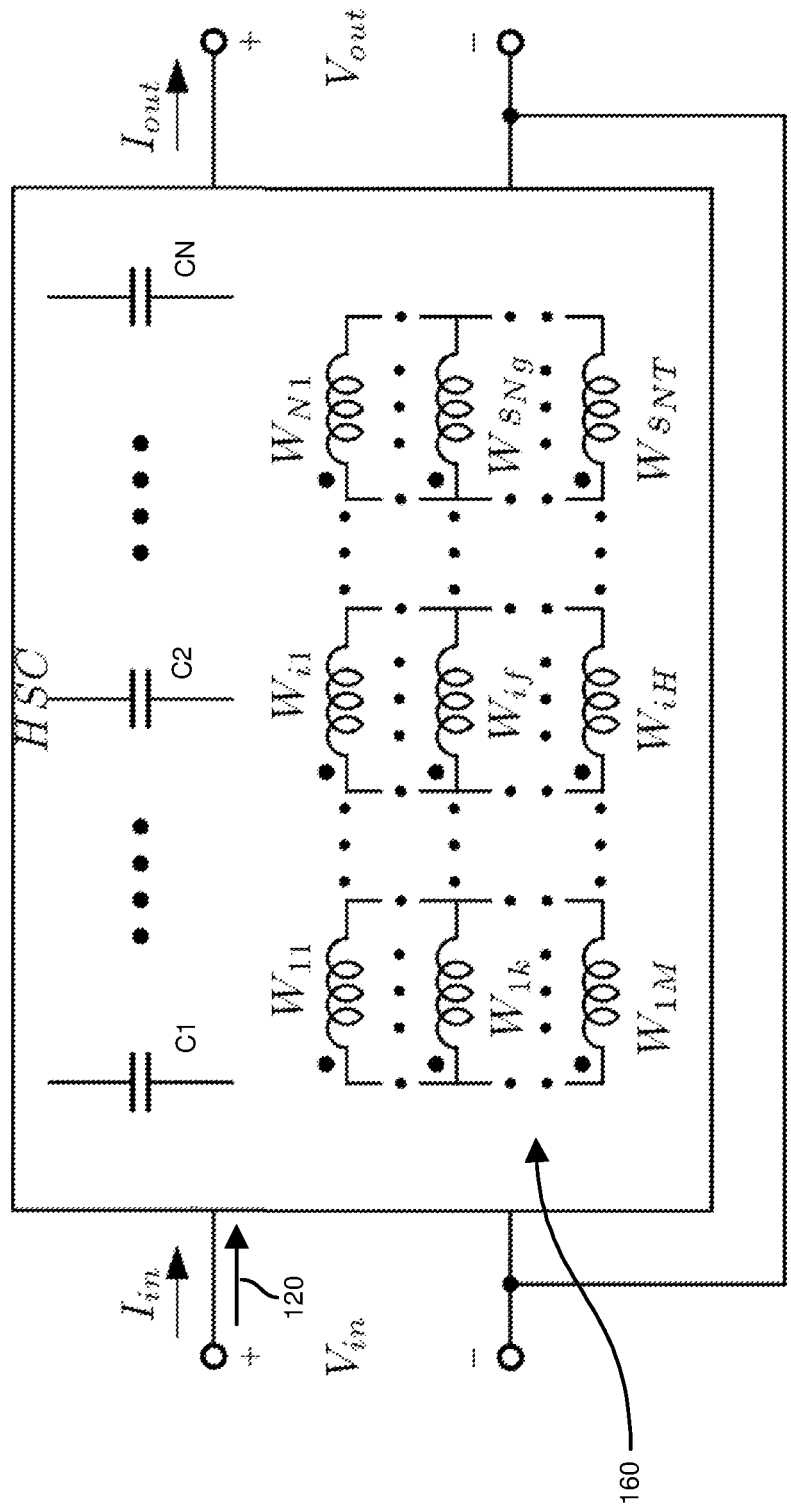
FIG. 2 is an example diagram illustrating an implementation of a hybrid switched-capacitor converter circuit according to embodiments herein.

FIG. 2 is an example diagram illustrating an implementation of a hybrid switched-capacitor converter circuit according to embodiments herein.
Hybrid Switched Capacitor Converter In one embodiment, the voltage converter 135 (such as a so-called Hybrid Switched capacitor converter) generates multiple output voltages 123 (output voltage 123-1 and output voltage 123-2), magnitudes of which depend on the transformer 160 such as a multi-tapped autotransformer turns ratio ($N_1/N_2$). The voltage converter 135 as in FIG. 2 comprises Switched Capacitor Cells (switched-capacitor converter 131) connected to a magnetic device (transformer 160).

In this example embodiment, the Switched Capacitor Cells (SCC) include capacitors C1, C2, . . . , CN, coupled to respective switching elements to provide a first division of the input voltage. The magnetic device (such as transformer 160) comprises N windings connected in series with each winding having one or more windings physically connected in parallel as generally depicted in FIG. 2. In one embodiment, all windings of the switched-capacitor converter 131 can be integrated into one magnetic core.

In one embodiment, the switched capacitor converter 131 can be interpreted from its step down characteristic as a buck type converter, as it is dividing the input voltage $V_{in}$ (input voltage 120) to an output voltage rail $V_{out}$ with a fixed ratio n. Simultaneously, the input current of Hybrid switched capacitor $I_{in}$ is multiplied by the same fixed ratio n; in such an instance $I_{out}=n*I_{in}$.

The Hybrid switched capacitor (such as switched-capacitor converter 131) depicted in FIG. 2 provides high efficiency, high power density, scalability (i.e., several instances of voltage converter 135 can be disposed in parallel if desired), low radiated electromagnetic noise, and low output impedance. The magnetic device (such as transformer 160) reported in FIG. 2 ensures soft-charging of the switched capacitor cells reducing or eliminating short circuit losses, improving the utilization and performance of the capacitors and thus helping to achieve a high capacitive energy-density.

As further discussed herein, an unregulated voltage converter 135 provides superior efficiency and low impedance behavior. As reported, the voltage converter 135 and corresponding switched-capacitor converter 131 can be formed by switching capacitor cells and magnetic device coupled to switching elements in such a way as to form one or more series resonant circuits. See below for more implementation details.

As shown in FIG. 2, the voltage converter 135 can be configured to provide one unregulated rail from an input voltage $V_{in}$ (input voltage 120) where the output voltage (such as output voltage 123-1 or output voltage 123-2) depends on the input voltage 120 and the actual fixed ratio of the converter and the output current. Considering the converter proposed in FIG. 2 and or any Hybrid switched capacitor converter, under the assumption that the voltage converter 135 is operated at its resonant frequency and considering that all switches (such as field effect transistors or other suitable components) are running in soft-switching, the converter's open-loop resistance can be approximately estimated by the following equation:

$$R_{out} = \frac{\pi^2}{8} \frac{R_{cell}}{2} \qquad \text{(equation 1)}$$

where $$R_{cell} = \left(\frac{R_{ac}}{2} + \frac{R_{disc}}{2}\right)\left(\frac{1}{4+2\frac{N_1}{N_2}}\right)^2.$$

therefore the actual output voltage is given by the following equation:

$$V_{out} = \frac{V_{in}}{n} - I_{out} * R_{out} \qquad \text{(equation 2)}$$

where n is the fixed ratio performed by the unregulated converter.

Figure 3:
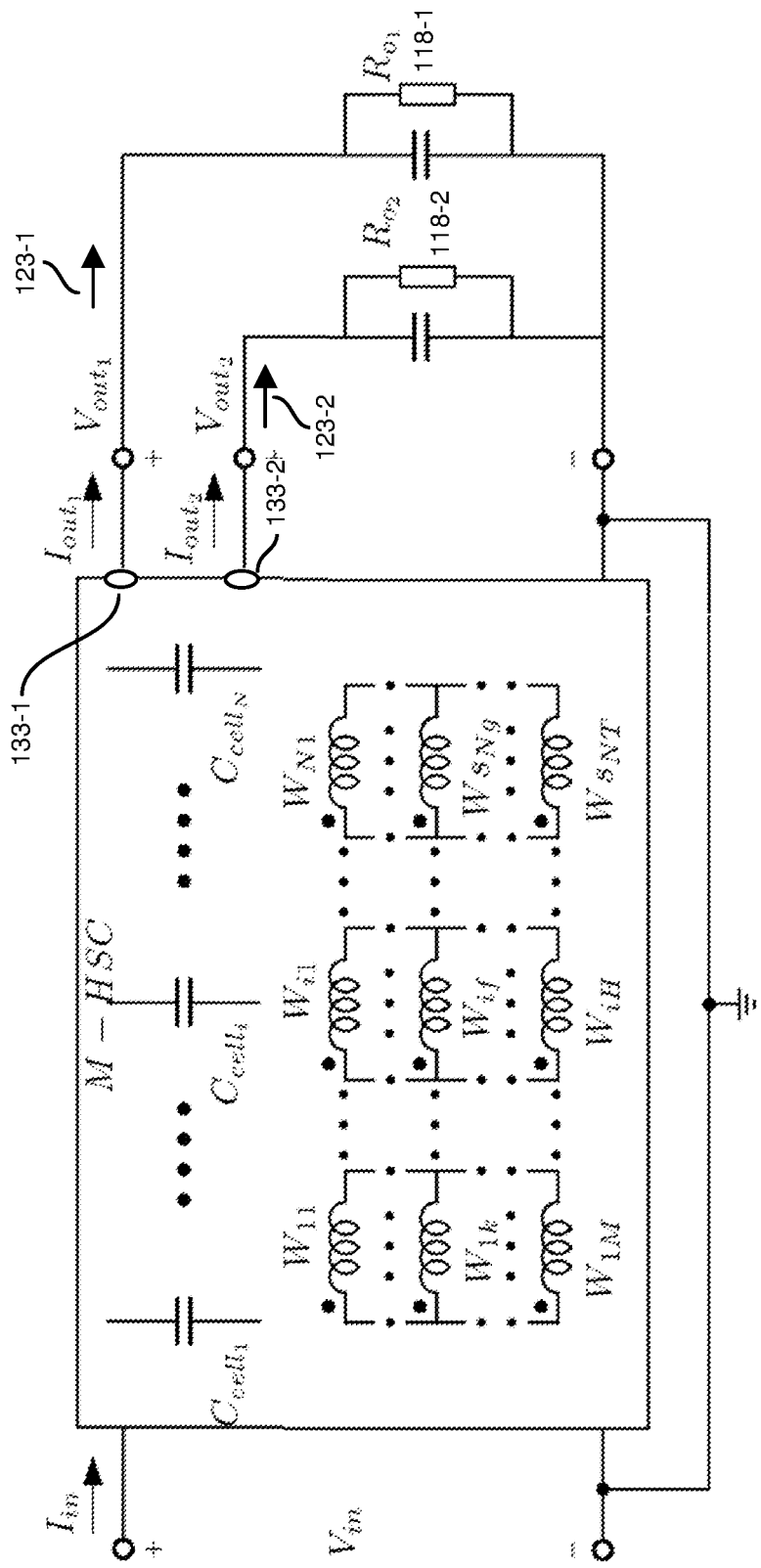
FIG. 3 is an example diagram illustrating implementation of a power converter operative to produce multiple output voltages according to embodiments herein.

FIG. 3 is an example diagram illustrating implementation of a power converter operative to produce multiple output voltages according to embodiments herein.

In this example embodiment, this instance of the voltage converter 135 produces an unregulated output voltage (viewer rail) from the input voltage 120. For example, in this example embodiment, the voltage converter 135 supplies, from a single input voltage rail providing input voltage 120, two parallel output voltage rails within the same converter, where the converter is a dual-phase resonant converter (i.e. the input is powered for a time period longer that 50% of the duty cycle).

In one embodiment, the proposed voltage converter such as a Multi-Rail Hybrid Switched capacitor (M-HSC) converter in FIG. 3 provides high efficiency, high power density, scalability (i.e. several M-HSC can be parallelized), low radiated electromagnetic noise, low output impedance and therefore high transient performance. The proposed M-HSC comprises Switched Capacitor Cells (SCC) connected to a magnetic device, shown in the most general way in FIG. 3. Note that the magnetic device (such as transformer 160) and corresponding windings W11, . . . , Wi1, . . . , Wn1, . . . , ensure soft-charging of the switched capacitor cells reducing or eliminating short circuit losses, improving the utilization and performance of the capacitors and thus helping to achieve a high capacitive energy-density.

In the M-HSC, by merging switched capacitor cells of the switched-capacitor converter 131 and a magnetic device (transformer 160), it is possible to shape the current waveforms and voltage waveforms in an advantageous manner such as shown, for example, creating an overall resistive behavior of the converter.

In this example embodiment, the M-HSC provides from a single input voltage two over-voltages 123-1 and 123-2 from respective rails, where their output impedance depends on the actual load condition (such as loads 118-1 and 118-2) in the other rail, so as the following equation, as first order of approximation, are valid:

$$V_{out1} \simeq \frac{V_{in}}{n_1} - I_{out1} * R_{o1}(I_{out2}) \quad \text{(equation 3)}$$

$$V_{out2} \simeq \frac{V_{in}}{n_2} - I_{out2} * R_{o2}(I_{out1}) \quad \text{(equation 4)}$$

The approximation is actually given by the presence of losses between the path which is going from $V_{out1}$ (123-1) to $V_{out2}$ (123-2) and viceversa.

Considering the generalized structure of the voltage converter 135 shown in FIG. 3, the input current $I_{in}$ present low RMS since the converter here proposed is a dual-phase resonant converter (i.e. the converter received power from the input voltage for almost the entire switching cycle).

Power Architecture to Supply Two Unregulated Rails

As previously discussed, FIG. 3 illustrates a voltage converter 135, which is able to supply from a single input voltage rail (input voltage 120) two single output voltage rails, where the magnitude of the output voltages 123-1 and 123-2 depend on the ratio $n_1$, as reported in equation 3, and the ratio $n_2$, as reported in equation 4. Such a power architecture allows a respective power supply to supply two separated unregulated rails such as only when the droop resistance of each rail is considerably low or they have similar value considering different load scenarios on each rail.

Figure 4:
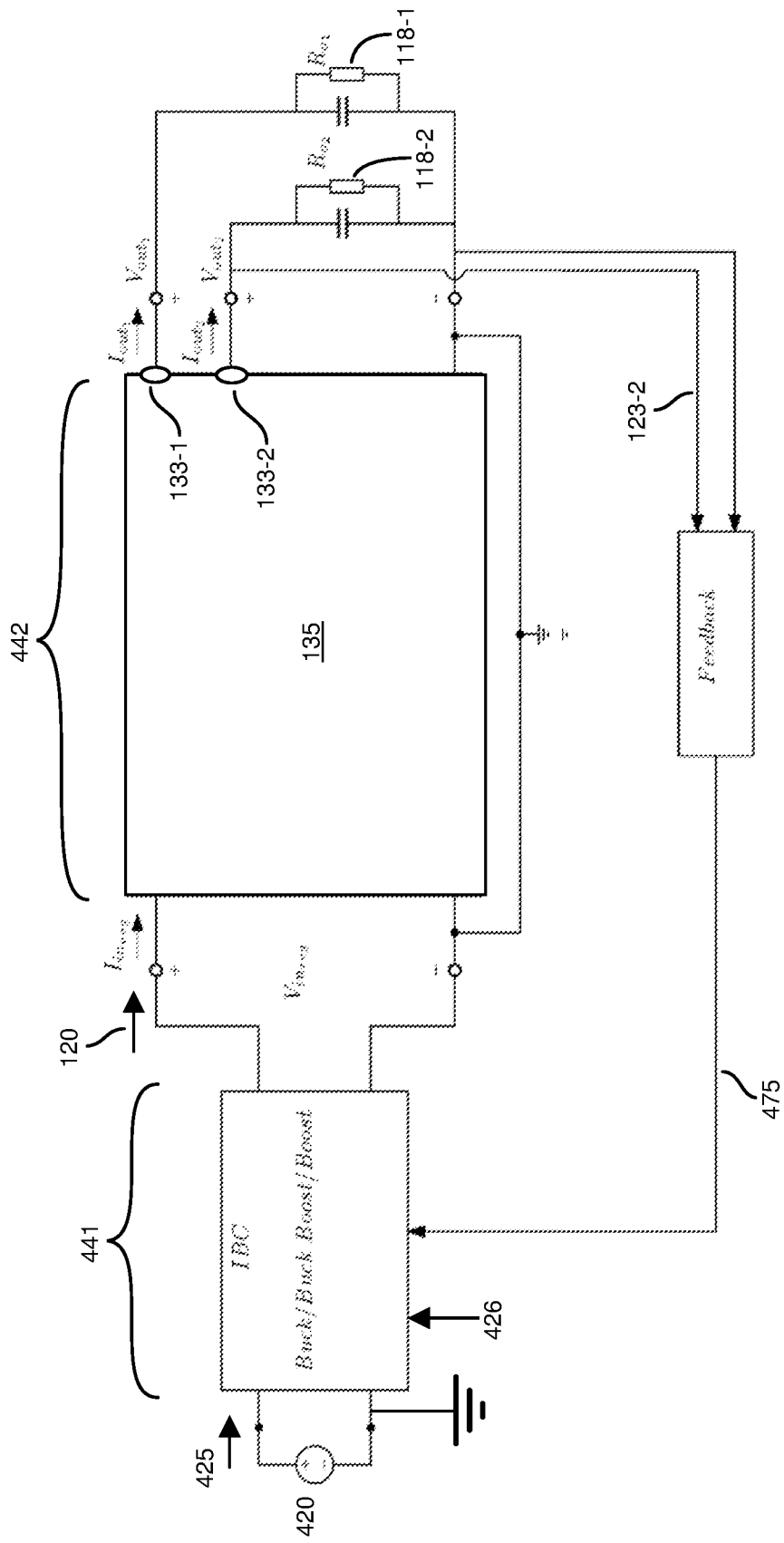
FIG. 4 is an example diagram illustrating implementation of a multi-stage power supply according to embodiments herein.

FIG. 4 is an example diagram illustrating implementation of a power supply according to embodiments herein.

Power architecture to supply one regulated rail and one semi-regulated rail FIG. 4 illustrates a novel power architecture in which a first stage 441 receives power (input voltage 425) from a power source 420 (e.g., a 48 VDC distribution bus on a server rack) and provides a regulated output voltage (such as output voltage 123-2) from a second stage 442 and a second semi-regulated/regulated output voltage rail (such as output voltage 123-1) from the same voltage converter 435 (i.e., a M-HSC converter).

In one embodiment, the second stage 441 is coupled at its input to an intermediate regulated bus voltage (such as to receive input voltage 120) and is coupled at its output to power the loads $R_{o1}$ (such as load 118-1) and $R_{o2}$ (such as load 118-2). In one embodiment, the second stage 442 divides the input voltage 120 and produces two different rails at two different ratio as reported in equation 3 and equation 4, where one of the two rails is getting regulated while the second is semi-regulated/regulated. Alternatively, both of the output voltages may be unregulated.

Considering FIG. 4 as an example implementation of a voltage converter 135, the output voltage rail $V_{out2}$ (output voltage 123-2) is controlled by varying the input voltage $V_{in_{reg}}$ (input voltage 120).

Considering in this example embodiment that the output voltage $V_{out2}$ (output voltage 123-2) is regulated at the reference voltage $V_{out_{ref}}$, and taking into account equation 3 and equation 4, the following equations are valid:

$$V_{out_{ref}} = \frac{V_{in_{reg}}}{n_2} - I_{out2} * R_{out2}(I_{out1}) \quad \text{(equation 5)}$$

from where it follows that:

$$V_{in_{reg}} \simeq V_{out_{ref}} * n_2 + I_{out2} * R_{out2}(I_{out1}) * n_2 \quad \text{(equation 6)}$$

combining equation 6 with equation 3, it follows that:

$$V_{out_1} \simeq \quad \text{(equation 7)}$$
$$V_{out_{ref}} * \frac{n_2}{n_1} + I_{out2} * R_{out2}(I_{out1}) * \frac{n_2}{n_1} - I_{out1} * R_{out1}(I_{out2})$$

considering that the ideal target for $$V_{out_1} = V_{out_{ref}} * \frac{n_2}{n_1},$$

it follows that the voltage error on $V_{out_1}$ is given by the following equation:

$$\Delta V_{out_2}(I_{out1}, I_{out2}) \simeq \quad \text{(equation 8)}$$
$$I_{out2} * R_{out2}(I_{out1}) * \frac{n_2}{n_1} - I_{out1} * R_{out1}(I_{out2})$$

From equation 8 it follows that the voltage error is strongly dependent with the actual resistive output impedance (of load 118-1 and load 118-2) on each rail and their load condition, therefore providing a low impedance converter.

In one embodiment, the voltage converter 135 includes feedback 475 derived from the output voltage 123-2. The power supply in FIG. 4 indicates or represents a magnitude of the output voltage 123-2. The first stage voltage converter 441 (such as buck/boost converter or other suitable entity) receives reference setpoint voltage 426 and feedback 475 (such as a signal representative of a magnitude of the output voltage 123-2). In one embodiment, the first state voltage converter 441 (such as a DC-DC voltage converter) converts the input voltage 425 (such as 48 VDC or other suitable value) into the input voltage 120 to the voltage converter 135 of the second stage 442. More specifically, the first stage 441 produces an error voltage based on a different between the feedback 475 (such as output voltage 123-2) and the reference setpoint voltage 426. Based on the error voltage, the first stage voltage converter 441 controls a magnitude of the input voltage 120 such that the magnitude of the output voltage 123-2 is maintained at the desired value such as indicated by the setpoint voltage 426.

Thus, the proposed power delivering architecture as in FIG. 4 can be configured to supply from the same converter two output voltage rails: one regulated (output voltage 123-1) and the second semi-regulated/regulated (such as output voltage 123-2). The semi-regulation/regulation capability is explained by equation 8, where it follows that low converter output impedance are making such rail semi-regulated/regulated. For this reason a multi-rail Hybrid Switching capacitor converter is used for such approach.

Figure 5:
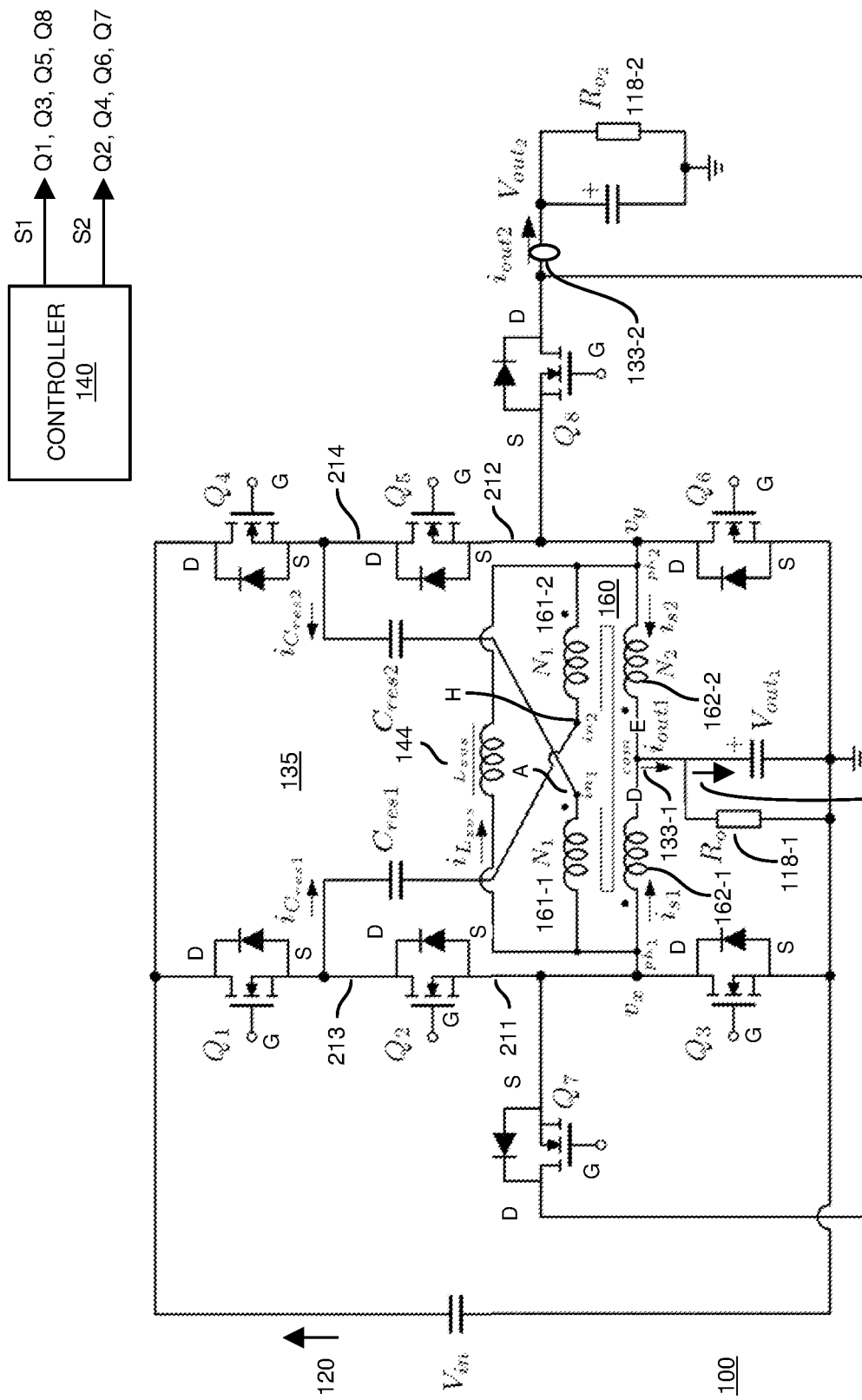
FIG. 5 is an example diagram illustrating implementation of a hybrid switched capacitor converter and multi-tapped autotransformer according to embodiments herein.

FIG. 5 is an example diagram illustrating implementation of a hybrid switched capacitor converter and multi-tapped autotransformer according to embodiments herein.

In this example embodiment, the voltage converter 135 includes inductor 144, capacitor Cres1, capacitor Cres2, an input voltage source (such as stage 441) producing input voltage 120, switches Q1, Q2, Q3, Q4, Q5, Q6, Q7, and Q8, transformer 160 such as including winding 161-1, winding 161-2, winding 162-1, and winding 162-2.

Voltage converter 135 includes: i) a first resonant circuit path including series connection of capacitor Cres1 and primary winding 161-2, and ii) a second resonant circuit path including capacitor Cres2 and primary winding 161-1. In one embodiment, both resonant capacitors are resonating with the leakage inductance Lk of the multi-tapped autotransformer 160. Note that the voltage converter 135 can be configured to include any number of resonant circuit paths. Switching of the resonant circuit paths as discussed herein produces output voltage 123-1 and output voltage 123-2.

As shown, the power supply in FIG. 5 includes voltage source Vin, switched-capacitor converter 131, and transformer 160.

The switched-capacitor converter 131 (apparatus such as hardware, circuitry, etc.) includes multiple switches Q1, Q2, Q3, Q4, Q5, Q6, Q7, and Q8 (such as field effect transistors or any other suitable type of switch). Additionally, the switched-capacitor converter 150 includes multiple circuit components including inductor Lzvs, capacitor Cres1, and capacitor Cres2.

Further in this example embodiment, the transformer 160 includes primary winding 161-1 (such as N1 turns), primary winding 161-2 (such as N1 turns), secondary winding 162-1 (such as N2 turns), and secondary winding 162-2 (such as N2 turns). The number of windings (N1, N2, etc.) associated with the primary winding 161 and/or the secondary winding 162 can be any suitable value and vary depending on the embodiment.

In one embodiment, a combination of the primary windings and secondary windings of transformer 160 are connected in series. For example, primary winding 161-1 is connected in series with secondary winding 162-1; primary winding 161-2 is connected in series with secondary winding 162-2; secondary winding 162-1 is connected in series with primary winding 162-2.

In one embodiment, all of the windings 161-1, 162-1, 162-2, and 161-2 are connected in series and are magnetically coupled to each other as shown. For example, in accordance with further embodiments, the winding 162 (such as a tapped secondary winding, or multiple secondary windings connected in series) is inductively coupled to the first primary winding 161-1 and second primary winding 161-2. In other words, as shown, the first primary winding 161-1, the second primary winding 161-2, and the secondary winding(s) 162 are magnetically coupled to each other.

If desired, the secondary winding 162 can be a center tapped winding facilitating generation of the output voltage 123 from a respective output of the center-tapped winding.

Further in this example embodiment, the drain node (D) of switch Q1 and the drain node (D) of switch Q4 are connected to the input voltage source Vin and receive the input voltage 120. Further, the source node (S) of the switch Q1 is coupled to the drain node (D) of the switch Q2 (at node 213). The source node (S) of the switch Q4 is coupled to the drain node (D) of the switch Q5 (at node 214). The source node (S) of the switch Q2 is coupled to node 211. The source node (S) of the switch Q5 is coupled to node 212.

Capacitor Cres1 is connected between node 213 and a respective node H of primary winding 161-2. Capacitor Cres2 is connected between node 214 and a respective node A of primary winding 161-1.

Inductor Lzvs (inductor 144) is coupled in parallel to primary winding 161 and is disposed between node 211 and node 212.

The drain (D) of switch Q3 is connected to node 211; the source (S) of switch Q3 is connected to ground. The drain (D) of switch Q6 is connected to node 212; the source (S) of switch Q6 is connected to ground.

The center tap (com node) of the secondary winding 162 outputs current Iout and corresponding output voltage 123 to drive load 118 (a.k.a., Ro).

The source node of switch Q7 is connected to the node 211; the drain node of switch Q7 is connected to the output 133-2; the source node of switch Q8 is connected to the node 212; the drain node of switch Q7 is connected to the output 133-2.

The voltage converter 135 produces the respective output voltage 123-1 outputted from the output 133-1 to the load 118-1. The voltage converter 135 produces the respective output voltage 123-2 outputted from the output 133-2 to the load 118-2.

Technical Implementations of the Proposed Multi-Rail Hybrid Switched Capacitor Converter Yet further example embodiments herein include a converter comprising switched capacitor cells and at least one magnetic structure supplying two voltage rail in parallel having different voltage, as shown in the previous sections of this disclosure. FIG. 5 is an example of a specific embodiment of a proposed M-HSC converter (such as voltage converter 135) supporting a zero-voltage switching hybrid switched-capacitor converter with a multi-tapped autotransformer (such as t 160) supplying two output rails (such as output voltage 123-1 and output voltage 123-2) to drive loads 118-1 and 118-2.

In one embodiment, the magnitudes of the two output voltage 123 track (such as move together) during a load transient due to an intrinsic dependency of the output resistive impedance on each of the two voltage rails.

This example embodiment of the multi-rail hybrid switched capacitor M-HSC converter (power supply 500) includes an interleaved flying capacitor structure, forming two switching capacitor cells, connected to a multi-tapped autotransformer (MTA) as shown in FIG. 5. An additional inductance such as inductor 144 in parallel with the multi-tapped autotransformer (such as transformer 160) is added to achieve zero voltage switching (ZVS) for all MOSFETs. Note that the inductor 144 can also be integrated into the MTA to reach higher power density. The proposed MR-HSC can supply two rails in parallel $V_{out_1}$ (output voltage 123-1) and $V_{out_2}$ (output voltage 123-2).

In further example embodiments, the magnitude of the voltage of each output voltage rail (from the output 133-1 and output 133-2) depends on the multi-tapped autotransformer turns ratio ($N_1/N_2$). The ratio between input voltage $V_{in}$ (input voltage 120) and the output voltage $V_{out_1}$ (output voltage 123-1) is given by the following equation:

$$\frac{V_{in}}{V_{out_1}} = 4 + 2\frac{N_1}{N_2} \qquad \text{(equation 9)}$$

Considering the circuit reported in FIG. 5, the output voltage $V_{out2}$ is $2*V_{out1}$ therefore the ratio between input voltage $V_{in}$ and output voltage $V_{out2}$ is given by the following equation:

$$\frac{V_{in}}{V_{out_2}} = 2 + \frac{N_1}{N_2} \qquad \text{(equation 10)}$$

According to this, the proposed M-HSC is scalable itself to different conversion ratios by designing only the ratio between $N_1$ and $N_2$, which actually leads to claim a new family of unregulated multi-rail hybrid switched dc-dc converter with different ratio (i.e., 3 to 1, 4 to 1, 5 to 1, 6 to 1, 7 to 1, 8 to 1 . . . ).

All switches (Q1-Q8) can be divided into two switch groups: the first switch group is formed by $Q_1$, $Q_3$, $Q_5$ and $Q_8$ (control logic $PWM_H$ such as signal S1 drives respective gates of switches Q1, Q3, Q5, and Q8), and the second switch group ($Q_2$, $Q_4$, $Q_6$ and $Q_7$) is controlled by a 180° phase shifted PWM signal (control logic $PWM_L$ such as signal S2 drives respective gates of switches Q2, Q4, Q6, and Q7) with respect to the first group using the same duty cycle.

Controller 140 produces the control signal S1 driving gates of switches Q1, Q3, Q5, and Q8 and control signal S2 driving gates of switches Q2, Q4, Q6, and Q7.

The voltage converter 135 in FIG. 5 operates with a fixed frequency and duty cycle ideally near 50% to obtain a minimum RMS current.

The circuit (voltage converter 135) proposed in FIG. 5 takes advantage from the leakage inductance of the multi-tapped autotransformer (transformer 160) to soft charge the flying capacitors $C_{res1}$ and $C_{res2}$. In one embodiment, these capacitors are actually acting as flying capacitors, enabling to use of field effect transistors (such as switches Q1-Q8) having a lower voltage class at the input side of the transformer 160 in comparison, for example, with a classic LLC topology.

Figure 6:
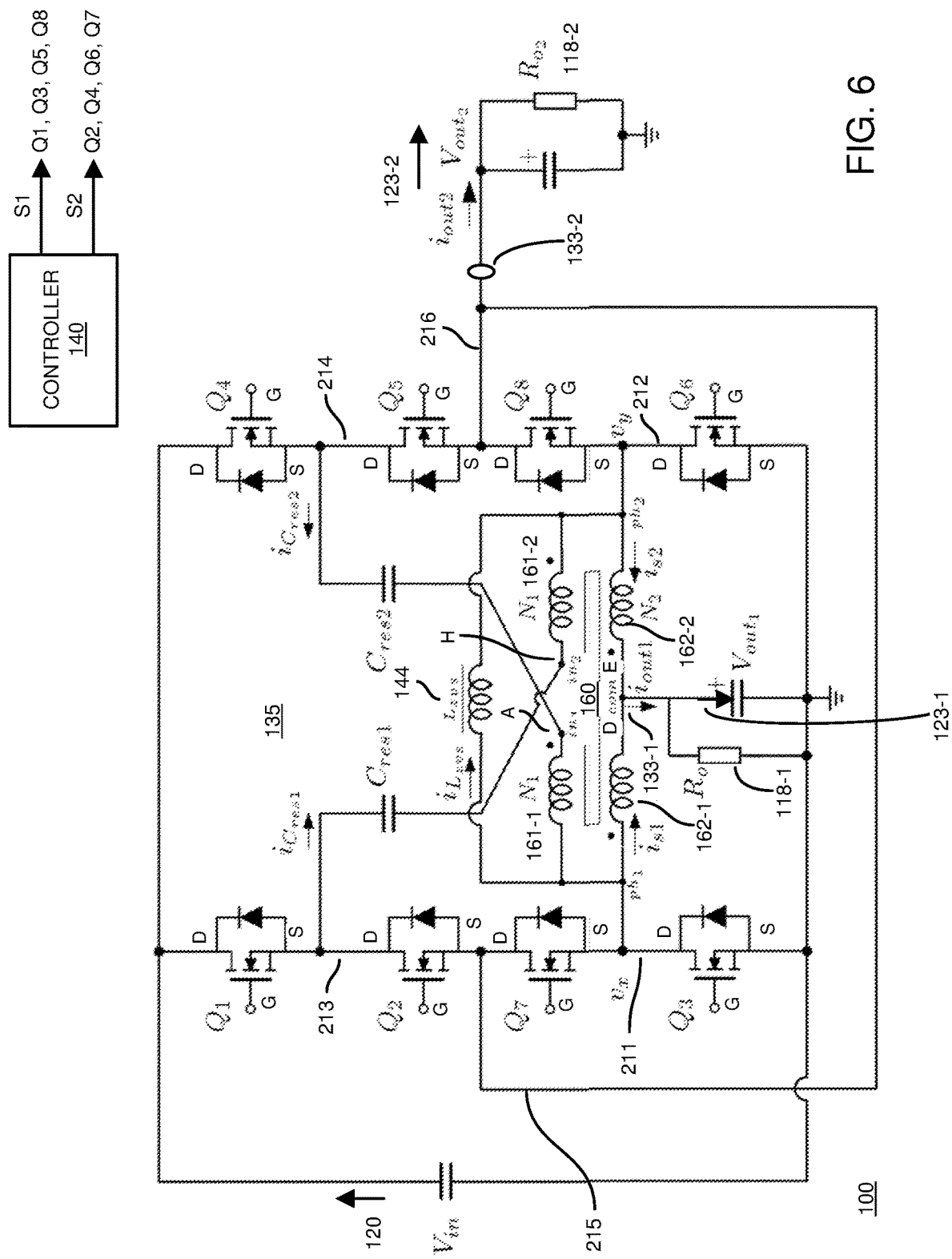
FIG. 6 is an example diagram illustrating implementation of a hybrid switched capacitor converter according to embodiments herein.

FIG. 6 is an example diagram illustrating implementation of a hybrid switched capacitor converter according to embodiments herein.

In this example embodiment, the voltage converter 135 includes inductor 144, capacitor Cres1, capacitor Cres2, an input voltage source (such as stage 441) producing input voltage 120, switches Q1, Q2, Q3, Q4, Q5, Q6, Q7, and Q8, transformer 160 such as including winding 161-1, winding 161-2, winding 162-1, and winding 162-2.

As shown, the power supply in FIG. 6 further includes voltage source Vin, switched-capacitor converter 131, and transformer 160.

Voltage converter 135 includes: i) a first resonant circuit path including series connection of capacitor Cres1 and primary winding 161-2, and ii) a second resonant circuit path including capacitor Cres2 and primary winding 161-1. In one embodiment, both resonant capacitors are resonating with the leakage inductance Lk of the multi-tapped autotransformer 160. Note that the voltage converter 135 can be configured to include any number of resonant circuit paths.

The switched-capacitor converter 131 (apparatus such as hardware, circuitry, etc.) includes multiple switches Q1, Q2, Q3, Q4, Q5, Q6, Q7, and Q8 (such as field effect transistors or any other suitable type of switch). Additionally, the switched-capacitor converter 131 includes multiple circuit components including inductor Lzvs, capacitor Cres1, and capacitor Cres2.

Further in this example embodiment, the transformer 160 includes primary winding 161-1 (such as N1 turns), primary winding 161-2 (such as N1 turns), secondary winding 162-1 (such as N2 turns), and secondary winding 162-2 (such as N2 turns). The number of windings (N1, N2, etc.) associated with the primary winding 161 and/or the secondary winding 162 can be any suitable value and vary depending on the embodiment.

In one embodiment, a combination of the primary windings and secondary windings of transformer 160 are connected in series. For example, primary winding 161-1 is connected in series with secondary winding 162-1; primary winding 161-2 is connected in series with secondary winding 162-2; winding 162-1 is connected in series with winding 162-2.

In one embodiment, all of the windings 161-1, 162-1, 162-2, and 161-2 are connected in series and are magnetically coupled to each other as shown.

For example, in accordance with further embodiments, the winding 162 (such as a tapped secondary winding, or multiple secondary windings connected in series) is inductively coupled to both the first primary winding 161-1 and second primary winding 161-2. In other words, as shown, the first primary winding 161-1, the second primary winding 161-2, and the secondary winding(s) 162 (162-1 and 162-2) are magnetically coupled to each other. If desired, the secondary winding 162 can be a center tapped winding facilitating generation of the output voltage 123 from a respective output of the center-tapped winding.

Further in this example embodiment, the drain node (D) of switch Q1 and the drain node (D) of switch Q4 are connected to the input voltage source Vin.

Further, the source node (S) of the switch Q1 is coupled to the drain node (D) of the switch Q2 (node 213). The source node (S) of the switch Q4 is coupled to the drain node (D) of the switch Q5 (node 214).

The source node (S) of the switch Q2 is coupled to node 215 and output 133-2. The source node (S) of the switch Q5 is coupled to node 216 and output 133-2. Node 215 and node 216 represent a same node.

As further shown, the drain node (D) of switch Q7 is connected to the source node (S) of the switch Q2 at node 215. The source node (S) of the switch Q7 is coupled to the drain node (D) of the switch Q3 at node 211. The drain node (D) of the switch Q7 is also coupled to node 215 and output 133-2.

The drain node (D) of switch Q8 is connected to the source node (S) of the switch Q5 at node 216. The source node (S) of the switch Q8 is coupled to the drain node (D) of the switch Q6 at node 212. The drain node (D) of the switch Q8 is coupled to node 216 and output 133-2.

Capacitor Cres1 is connected between node 213 and a respective node H of primary winding 161-2. Capacitor Cres2 is connected between node 214 and a respective node A of primary winding 161-1.

Inductor 144 such as Lzvs is coupled in parallel to primary winding 161 and is disposed between node 211 and node 212.

The drain (D) of switch Q3 is connected to node 211; the source (S) of switch Q3 is connected to ground. The drain (D) of switch Q6 is connected to node 212; the source (S) of switch Q6 is connected to ground.

The center tap (corn or common node) of the secondary winding 162 outputs current Iout and corresponding output voltage 123-1 to drive load 118-1 (a.k.a., Ro).

The voltage converter 135 produces the respective output voltage 123-1 outputted from the output 133-1 to the load 118-1. The voltage converter 135 produces the respective output voltage 123-2 outputted from the output 133-2 to the load 118-2.

To reduce the current stress on switches $Q_7$ and $Q_8$, improving the power capability for rail $V_{out2}$, in FIG. 6 is proposed a modification of the circuit shown in FIG. 5, where all the switches can be divided into two switch groups: the first switch group is formed by $Q_1$, $Q_3$, $Q_5$ and $Q_8$ (control logic $PWM_H$ such as signal S1), and the second switch group ($Q_2$, $Q_4$, $Q_6$ and $Q_7$) is commanded by a 180° phase shifted PWM signal (control logic $PWM_L$ such as signal S2) with respect to the first group using the same duty cycle.

In this example embodiment, the controller 140 produces the control signal S1 driving gates of switches Q1, Q3, Q5, and Q8 and control signal S2 driving gates of switches Q2, Q4, Q6, and Q7. In one embodiment, the voltage converter 135 in FIG. 6 presents the same transfer function input voltage $V_{in}$ to output voltage rails $V_{out_1}$ and $V_{out_2}$ reported respectively in equation 9 and equation 10.

Figure 7:
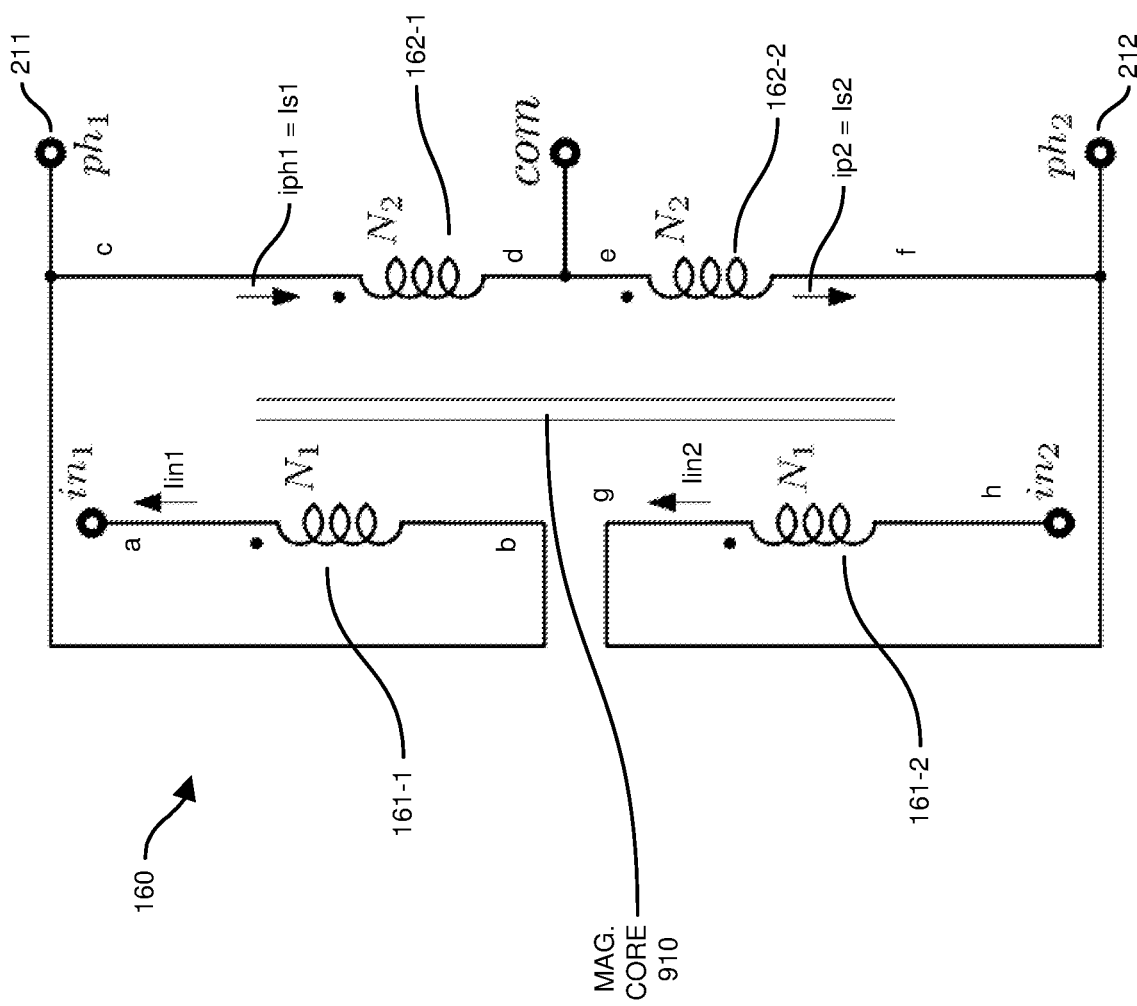
FIG. 7 is an example diagram illustrating implementation of a multi-tapped autotransformer according to embodiments herein.

FIG. 7 is an example diagram illustrating implementation of a multi-tapped autotransformer according to embodiments herein.

One benefit of implementing the transformer 160 (such as multi-tapped autotransformer) in the voltage converter 135 is high efficiency and high power density, enabling use of lower voltage rating MOSFETs (such as for switches Q1-Q8) compared to a classic LLC converter and enabling the choice of implementing Class II ceramic capacitors (such as for Cres1 and Cres2), which inherently offer high capacitance density.

Moreover, as previously discussed, the additional inductor 144 such as Lzvs (alternatively implemented via the magnetizing inductance of the multi-tapped autotransformer) provides the inductive energy to ensure ZVS transition for all switches (such as MOSFETs) in the voltage converter 135.

In addition to these benefits, another benefit of the transformer 160 is the inherent lower windings losses in comparison to classic LLC converters; the overall conduction stresses for all FETs (such as switches Q1-Q8) are reduced, providing a higher reliability power.

As shown in FIG. 7, one example of a proposed multi-tapped autotransformer 160 comprises: 4 windings. All windings are arranged in series, starting from terminal node in1 (node a) and ending at terminal node in2 (node h). More specifically, a combination of primary winding 161-1 (between node a and node b), secondary winding 162-1 (between node c and node d), secondary winding 162-2 (between node e and node f), and primary winding 161-2 (between node g and node h) are connected in series between node in1 and node in2. Transformer 160 includes so-called taps at node in1, tap node ph1, tap node com, tap node ph2, and node in2.

In this example embodiment of FIG. 7, the four windings of the multi-tapped autotransformer 161 are wound on or around a common magnetic core 910, forming a multi-tapped autotransformer. As previously discussed, the windings of transformer 160 include: i) a first group of windings (any suitable number of windings) formed by the primary windings between node in1 and node ph1 and between node in2 and node ph2; ii) a second group of windings (any suitable number of windings) includes secondary winding 162-1 and secondary winding 162-2 such as between node PH1 and node PH2.

Thus, as shown in FIG. 7, the transformer 160 comprises 4 windings. All windings are arranged in series, starting from terminal $in_1$, as reported in FIG. 1, to $in_2$. The structure is explained in more detail as follows: a four-windings multi-tapped autotransformer is shown in FIG. 7, where the windings are wound on one magnetic core. The windings can be divided into two winding groups: the first group is formed by the windings between $in_1$-$ph_1$ and $in_2$-$ph_2$ (i.e. called "input winding group") whilst the second group is formed by the windings between com-$ph_1$ and com-$ph_2$ (i.e. called "output winding group"). The input windings receive energy from a switched capacitor network, while the output windings are coupled to the output. Based on this assumption and considering an ideal multi-tapped autotransformer 160, and considering that the Magneto Motive Force (MMF) is established by $i_{ph1}$ and $i_{ph2}$ on the output side, it must be countered by a mmf on the input side established by $i_{in_1}$ and $i_{in_2}$. In this scenario the following equation is always valid:

$$N_1 i_{in_1} + N_1 i_{in_2} = N_2 i_{ph_1} + N_2 i_{ph_2} \quad \text{(equation 11)}$$

Figure 8:
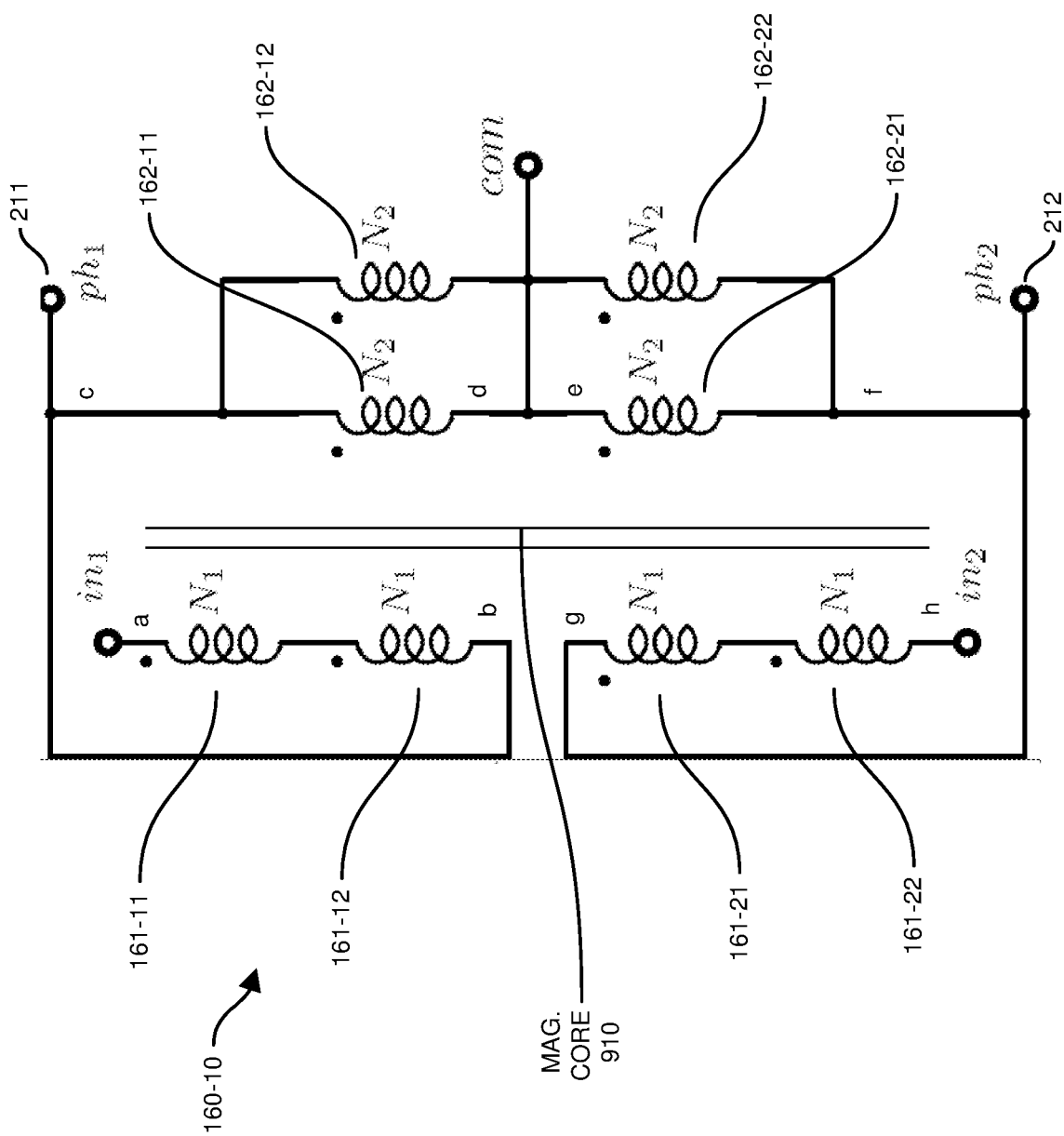
FIG. 8 is an example diagram illustrating implementation of a multi-tapped autotransformer according to embodiments herein.

FIG. 8 is an example diagram illustrating implementation of a multi-tapped autotransformer according to embodiments herein.

To further increase the performance of the magnetic component (transformer 160) of the voltage converter 135, embodiments herein can include implementing the transformer 160-10 in FIG. 8.

As previously reported in equation 9 and equation 10, the actual ratio between input voltage 120 and the output voltages 123 depends on the ratio between $N_1$ and $N_2$. Instead, if the multi-tapped matrix autotransformer, reported in FIG. 8 is implemented in the voltage converter 135, the ratio between input voltage 120 such as $V_{in}$ and output voltage $V_{out_1}$(output voltage 123-1) and output voltage $V_{out_2}$ (output voltage 123-2) is given by the following equations:

$$\frac{V_{in}}{V_{out_1}} = 4 + 2\frac{2N_1}{N_2} \quad \text{(equation 12)}$$

$$\frac{V_{in}}{V_{out_2}} = 2 + \frac{2N_1}{N_2} \quad \text{(equation 13)}$$

Figure 9:
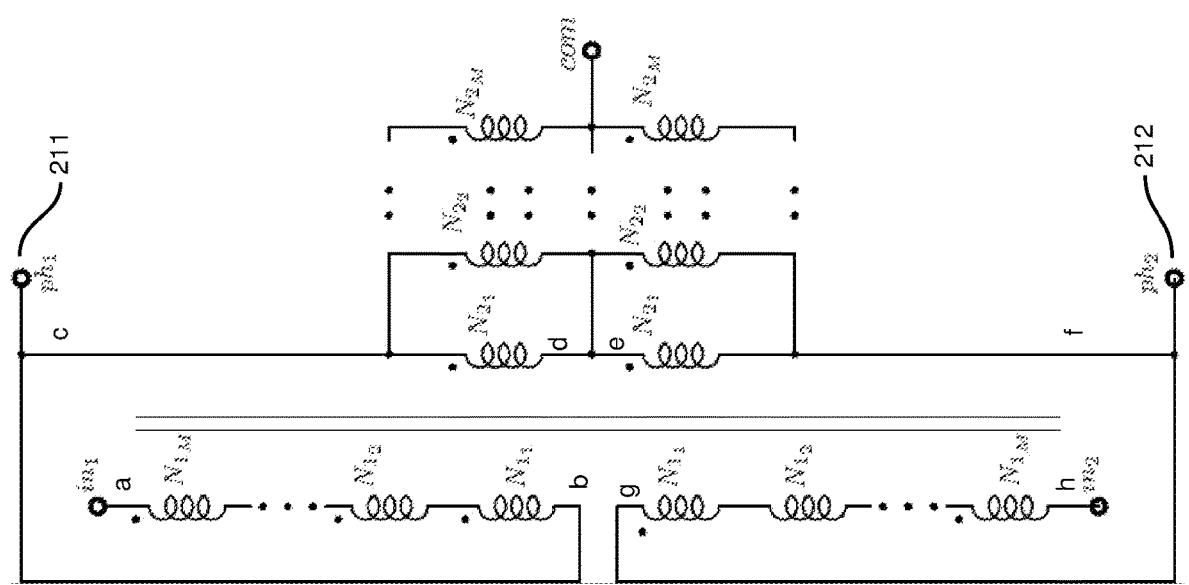
FIG. 9 is an example diagram illustrating implementation of a multi-tapped autotransformer according to embodiments herein.

FIG. 9 is an example diagram illustrating implementation of a multi-tapped autotransformer according to embodiments herein.

The embodiment shown is an example of a multi-tapped matrix autotransformer with M inter-wired winding elements, where $N_{1_1} = N_{1_2} = N_{1_x} = N_{1_M}$ and $N_{2_1} = N_{2_2} = N_{2_x} = N_{2_M}$. The transformer 160-11 can be implemented in the converter proposed in FIG. 5 and FIG. 6 as a corresponding magnetic component of the M-HSC circuit.

Moreover, if an array of MMTA is used, as reported in FIG. 9, with $N_{1_x}$ windings connected in series at the corresponding input side, whilst at the corresponding output side $N_{2_x}$ windings are connected in parallel. If an array of multi-tapped matrix autotransformer is used, the ratio between input voltage $V_{in}$ and output voltage $V_{out_1}$ and output voltage $V_{out_2}$ is given by the following equations:

$$\frac{V_{in}}{V_{out_1}} = 4 + 2\frac{MN_1}{N_2} \quad \text{(equation 14)}$$

$$\frac{V_{in}}{V_{out_2}} = 2 + \frac{MN_1}{N_2} \quad \text{(equation 15)}$$

where M is the number of windings connected in series at the input windings and in parallel at the output windings. The benefits of using a MMTA, in the proposed topology, are that it can split current between output windings connected in parallel reducing the leakage inductance of the output windings loop and reducing the overall winding losses.

Figure 10:
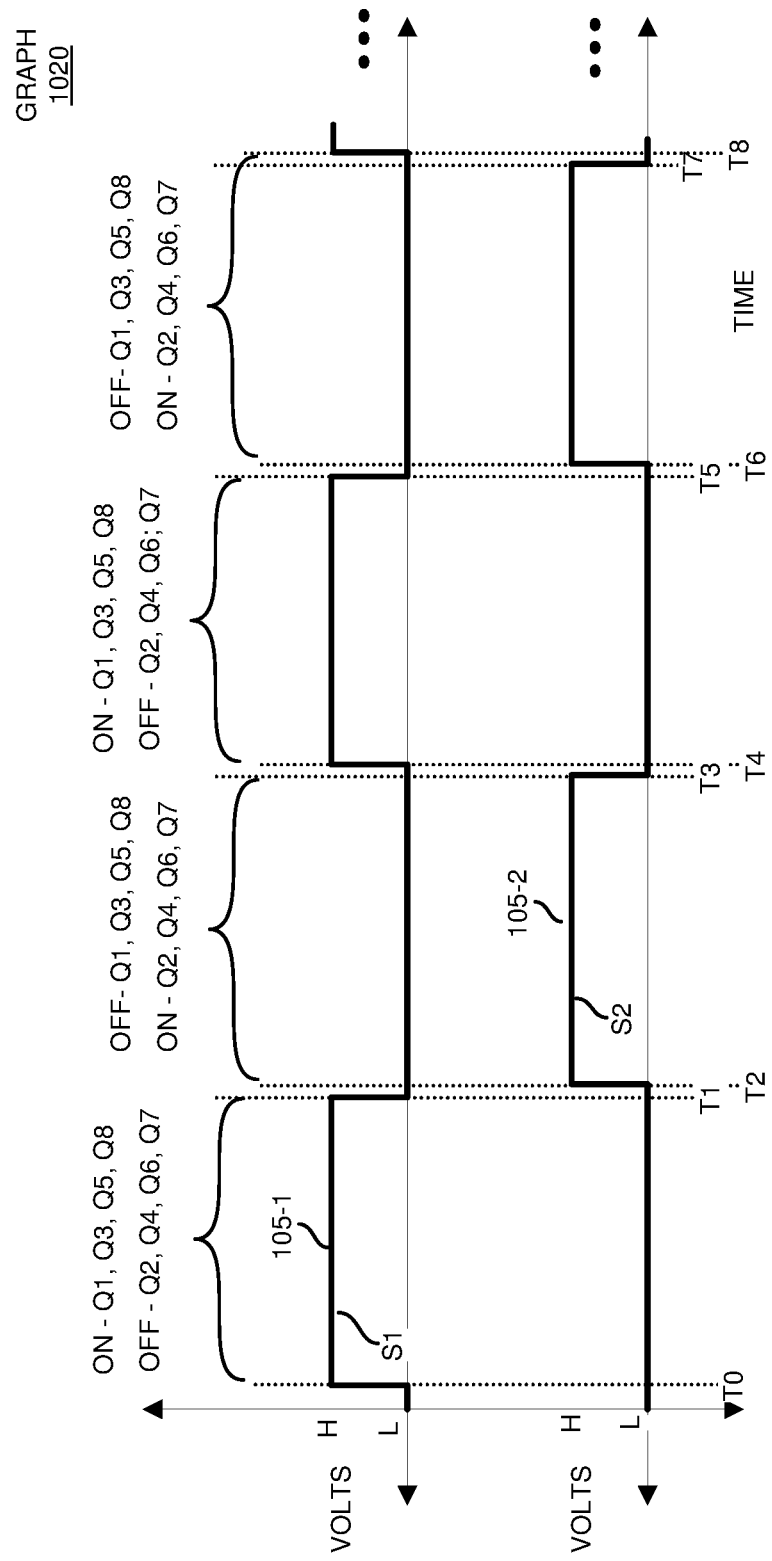
FIG. 10 is an example timing diagram illustrating generation of multiple control signals to control respective switches in a power converter according to embodiments herein.

FIG. 10 is an example timing diagram illustrating generation of multiple control signals to control respective switches in a power converter according to embodiments herein.

In general, as shown in graph 1020, the controller 140 produces the control signal 105-2 (a.k.a., control signal S2) to be an inversion of control signal 105-1 (a.k.a., control signal S1). A pulse width of each control signal is approximately 49% or other suitable pulse width modulation value.

Between time T0 and time T1, when the control signal 105-1 (at a logic high) controls the set of switches Q1, Q3, Q5, and Q8 to an ON state (low impedance or short circuit), the control signal 105-2 (logic lo) controls the set of switches Q2, Q4, Q6, and Q7 to an OFF state (very high impedance or open circuit).

Conversely, between time T2 and time T3, when the control signal 105-2 (logic high) controls the set of switches Q2, Q4, Q6, and Q7 to an ON state, the control signal 105-1 (logic low) controls the set of switches Q1, Q3, Q5, and Q8 to an OFF state.

Note that the duration between times T1 and time T2, the duration between time T3 and time T4, duration between T5 and T6, etc., represents so-called dead times during which each of the switches (Q1-Q6) in the power supply 100 is deactivated to the OFF state.

As further shown, the control signals 105 are cyclical. For example, the settings of control signals 105 for subsequent cycles is the same as those for the cycle between time T0 and time T4. More specifically, the settings of control signals 105 (control signals S1 and S2) produced by the controller 140 between time T3 and time T7 is the same as settings of control signals 105 between time T0 and time T3, and so on.

In one embodiment, the controller 110 controls the frequency of the control signals (period is time between T0 and time T4) can be generated at any suitable frequency.

Additionally, as previously mentioned, the controller 110 controls the pulse duration of the control signals 105 to be around 49% depending on the dead-time duration, although the control signals 105 can be generated at any suitable pulse width modulation value.

Figure 11:
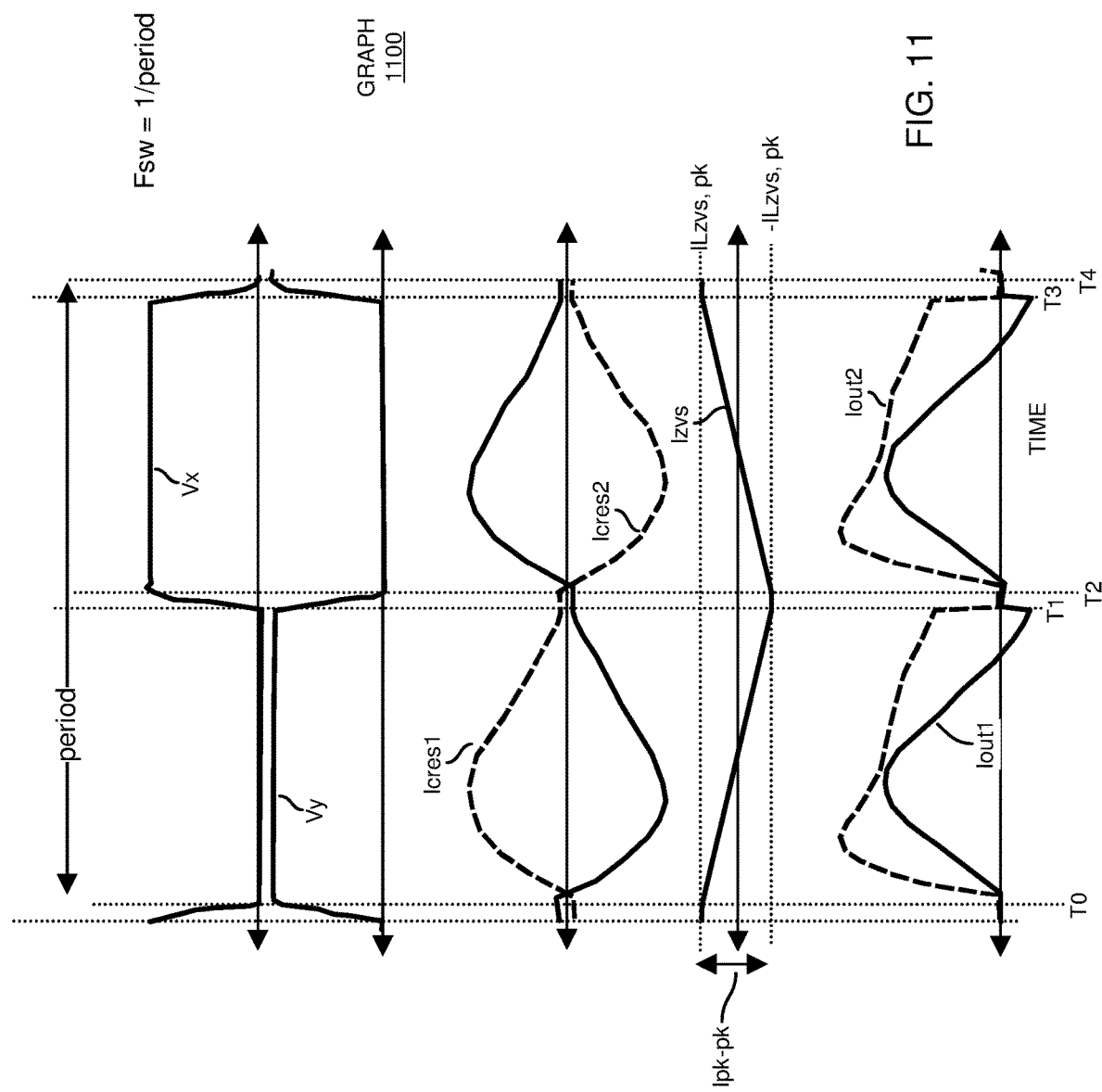
FIG. 11 is an example timing diagram illustrating signals associated with operation of a hybrid switched capacitor converter according to embodiments herein.

FIG. 11 is an example timing diagram illustrating signals associated with operation of a hybrid switched capacitor converter according to embodiments herein.

In this example embodiment, as previously discussed, the voltage Vx in graph 1100 indicates the voltage at node 211 between the primary winding 161-1 and the secondary winding 162-1; voltage Vy indicates the voltage at node 212 of the primary winding 161-2 and secondary winding 162-2.

Icres1 represents current through the series combination (resonant circuit path) of capacitor Cres1 and primary winding 161-2; Icres2 represents current though the series combination (resonant circuit path) of capacitor Cres2 and primary winding 161-1.

Izvs represents current through the inductor Lzvs.

Iout1 represents the output current associated with output voltage 123-1 and supplied by output 133-1 to a dynamic load 118-1.

Iout2 represents the output current associated with output voltage 123-2 and supplied by output 133-2 to a dynamic load 118-2.

Figure 12:
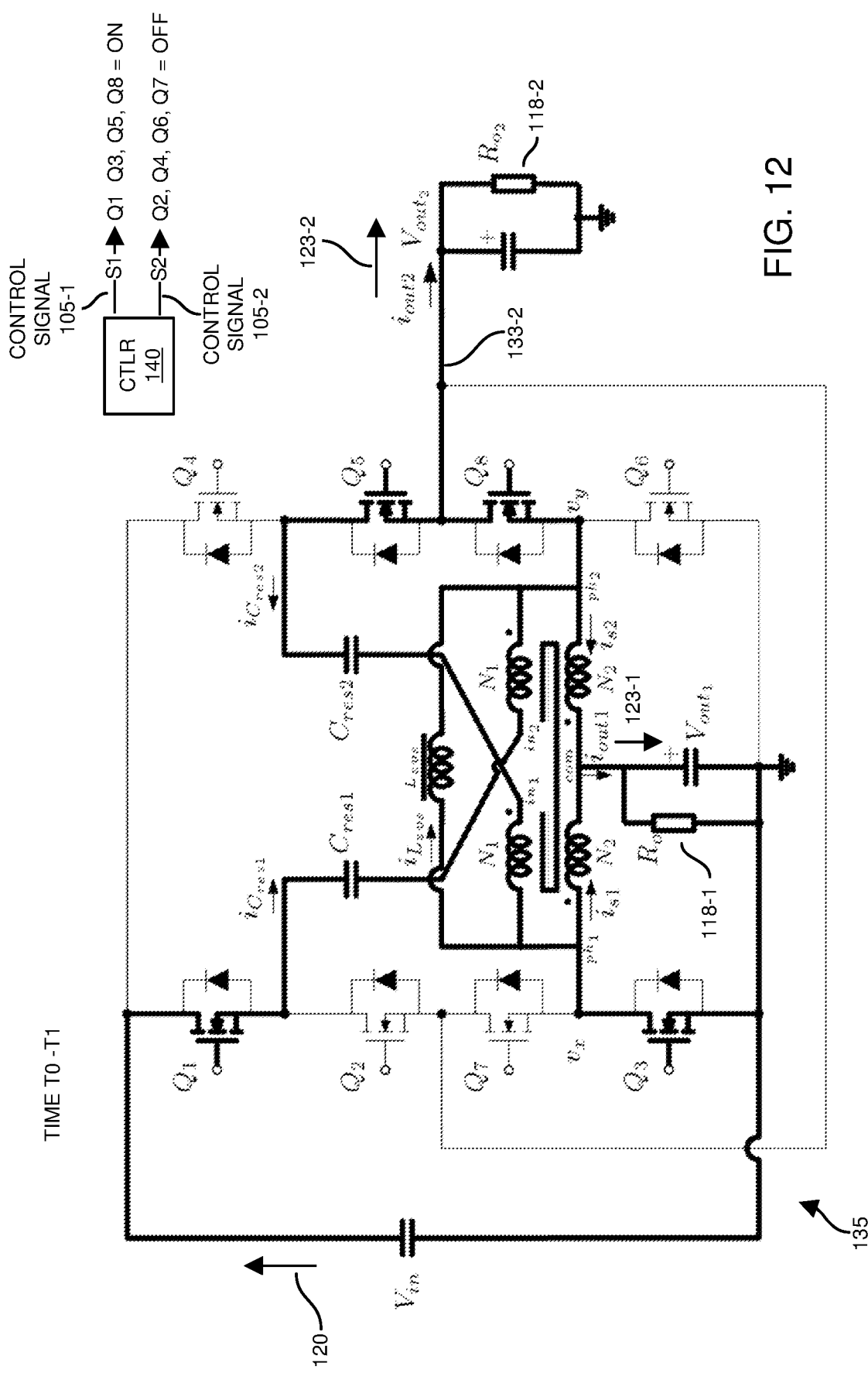
FIG. 12 is an example diagram illustrating operation of a hybrid switched-capacitor converter during a first portion of a control cycle according to embodiments herein.

FIG. 12 is an example diagram illustrating operation of a hybrid switched-capacitor converter during a first portion of a control cycle according to embodiments herein.

As previously discussed, the controller 140 operates in different modes between time T0 and time T4.

The four subintervals (T0-T1, T1-T2, T2-T3, and T3-T4) are described as follows:

1. $t_0$-$t_1$: at t=$t_0$ switches $Q_1$, $Q_3$, $Q_5$ and $Q_8$ are turned on in zero-voltage switching and the first resonant mode transition takes place between capacitor $C_{res1}$ and the leakage inductance of the multi-tapped autotransformer 160, whilst the second resonant mode transition takes place between capacitor $C_{res2}$ and the leakage inductance of the transformer 160. The state of switches associated with time T0 and time T1 is shown in FIG. 12 in which switches Q1, Q3, Q5, and Q8 are ON and Q2, Q4, Q6, and Q7 are OFF. In this phase $C_{res1}$ is soft-charged from the input voltage source $V_{in}$ (input voltage 120) whilst $C_{res2}$ is soft-discharged. When $C_{res1}$=$C_{res2}$ the RMS (Root Mean Square) current through each capacitor Cres1 and Cres2 is the same. Considering perfect balance between the actual resonant current through $C_{res1}$ and $C_{res2}$ $i_{Cres_1}(t)$=$-i_{Cres_2}(t)$ and considering $i_{C_{res1}}(t)$=$i_{res}(t)$, it follows that $i_{s_2}(t)$=$2i_{res}(t)$. In this scenario the following equation is valid in this phase:

$$N_1 i_{res}(t) + N_1 i_{res}(t) = N_2 i_{s_1}(t) - N_2 i_{s_2}(t) \qquad \text{(equation 16)}$$

which can be written as:

$$i_{i_{s1}}(t) = \left(\frac{2N_1}{N_2} + 2\right) i_{res}(t) \qquad \text{(equation 17)}$$

Figure 13:
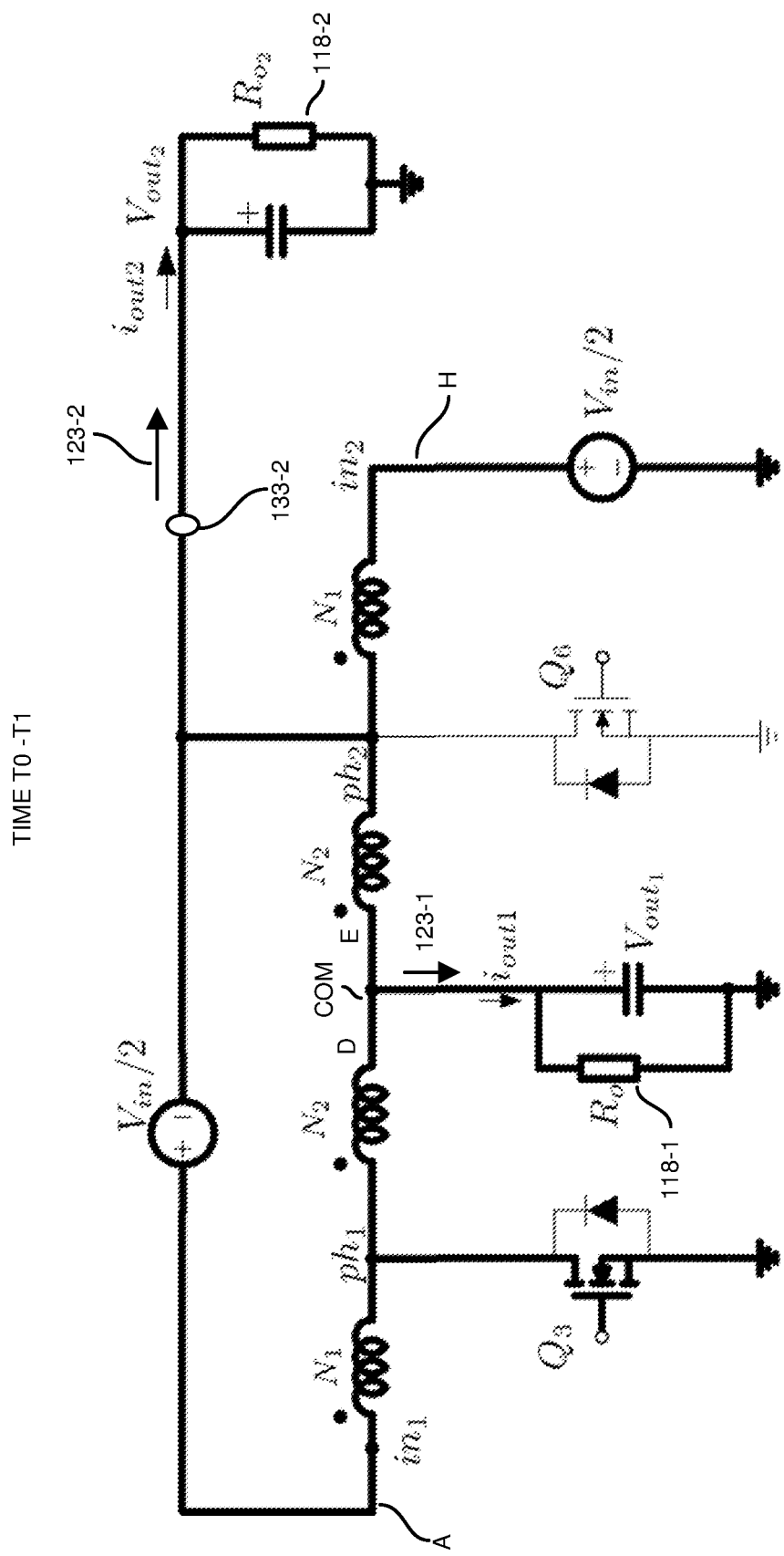
FIG. 13 is an example diagram illustrating an equivalent circuit operation of the hybrid switched capacitor converter in the first portion of the control cycle according to embodiments herein.

Thus, during phase $t_0$-$t_1$ (time T0 to time T1), both rails $V_{out_1}$ (output voltage 123-1) and $V_{out_2}$ (output voltage 123-2) are powered as shown in the equivalent circuit reported in FIG. 13. During phase $t_0$-$t_1$, rail $V_{out_1}$ is powered from the drain of $Q_8$ and the source of $Q_5$, however part of the current flowing into $C_{res2}$ drain $Q_5$ is also flowing to rail $V_{out_1}$ as shown in FIG. 12 and FIG. 13.

FIG. 13 is an example diagram illustrating an equivalent circuit operation of the hybrid switched capacitor converter in the first portion of the control cycle according to embodiments herein.

This is an example how this converter is capable to power two unregulated rails in parallel for operation between time T0 and time T1.

Figure 14:
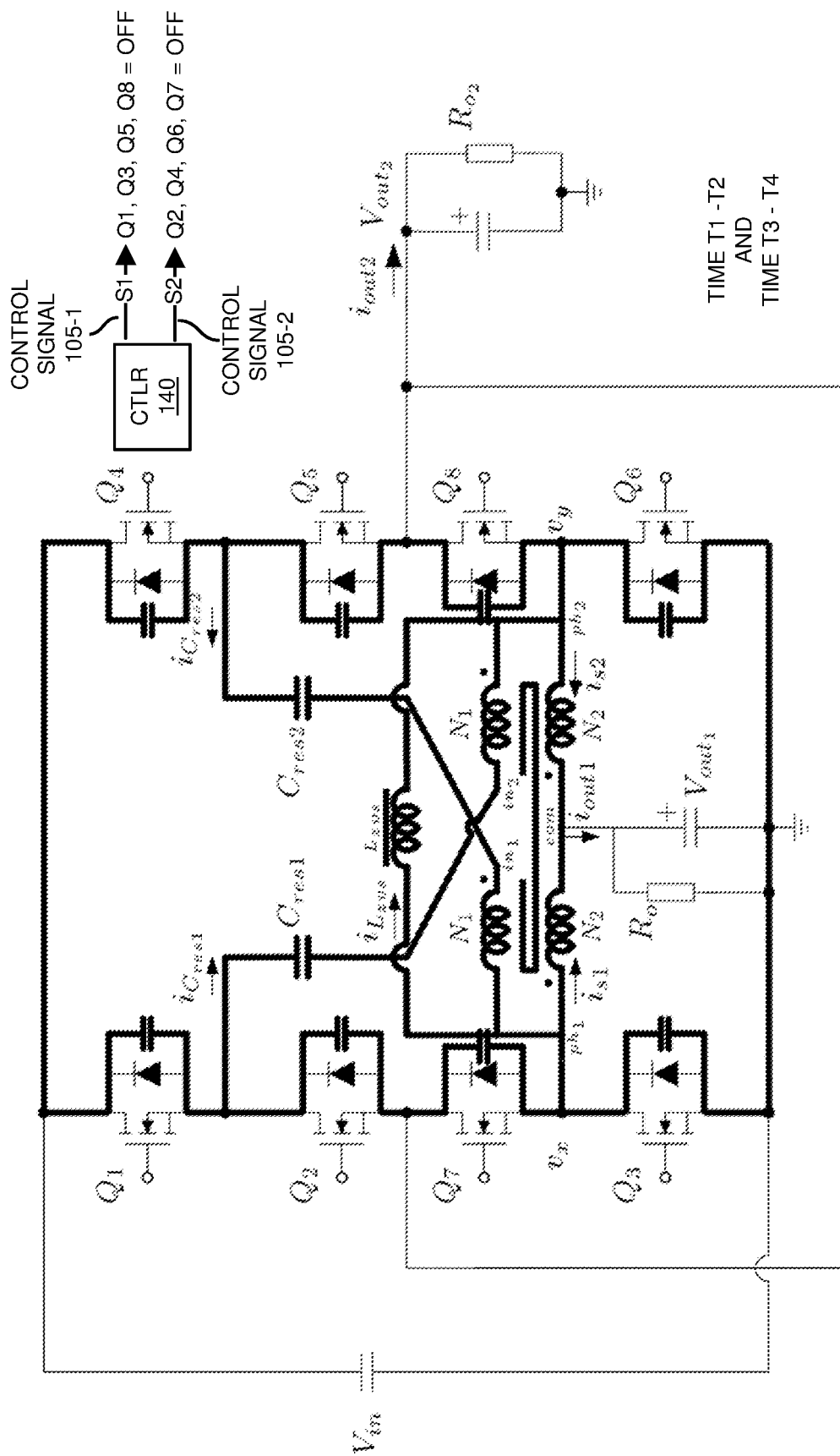
FIG. 14 is an example diagram illustrating operation of the hybrid switched capacitor converter during a dead time according to embodiments herein.

FIG. 14 is an example diagram illustrating operation of the hybrid switched capacitor converter during a dead time according to embodiments herein.

2. $t_1$-$t_2$: at t=$t_1$ switches $Q_1$, $Q_3$, $Q_5$ and $Q_8$ are turned OFF, $Q_2$, $Q_4$, $Q_6$ and $Q_7$ are OFF, and the parasitic capacitance of $Q_1$ is charged to $$V_{in}\left(\frac{1+\frac{N_1}{N_2}}{2+\frac{N_1}{N_2}}\right),$$

$Q_3$ is charged to $2V_{out1}$, $Q_5$ is charged to $$V_{in}\left(\frac{1+\frac{N_1}{N_2}}{2+\frac{N_1}{N_2}}\right),$$

$Q_8$ is charged to $2V_{out1}$, whilst the parasitic capacitance of $Q_2$, $Q_4$, $Q_6$ and $Q_7$ are discharged to zero, using the inductive energy stored in the $L_{zvs}$ inductance at $t=t_1$. When the capacitance of $Q_2$, $Q_4$, $Q_6$ and $Q_7$ are discharged to zero their body diodes start to conduct to enable ZVS turn on. The topological state is shown in FIG. 14. The current $i_{L_{zvs}}(t_1)$ that enables ZVS operation, is denoted as $i_{L_{zvs,pk}}$ which is given by the following equation:

$$I_{L_{zvs,pk}} = \frac{V_{out1}}{2*L_{zvs}*f_{sw}} \quad \text{(equation 18)}$$

The same equation is valid for the magnetizing inductance of the transformer 160 where the only difference is coming from the actual model of the inductance.

As discussed, one of the main benefits of such an approach, due to the combination of switched capacitor cell and a magnetic device, all the FETs are running in soft-switching because of all the switches are facing the inductive energy from the $L_{zvs}$ inductance. The soft-switching condition is achieved once the inductive energy stored in the $L_{zvs}$ inductance or in the integrated $L_{zvs}$ in the MTA is higher than the capacitance energy needed to charge and discharge all the FETs in order to achieve Zero Voltage Switching behavior within the dead-time interval $t_1$-$t_2$ or $t_3$-$t_4$. In other words, operation of the voltage converter 135 between times T1-T2 and T3-T4 is the same as shown in FIG. 14 and described above.

Figure 15:
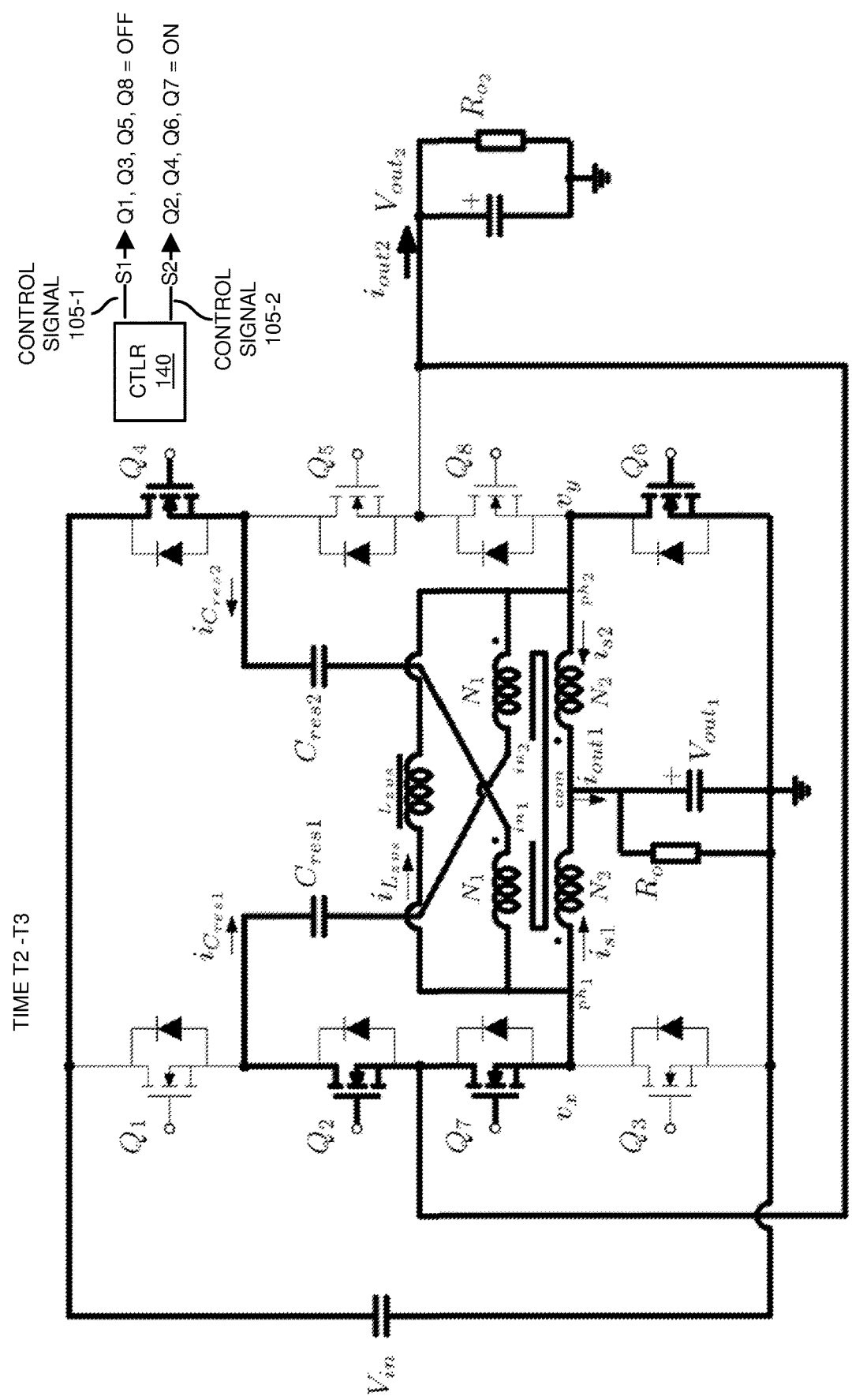
FIG. 15 is an example diagram illustrating operation of the hybrid switched capacitor converter during a second portion of the control cycle according to embodiments herein.

FIG. 15 is an example diagram illustrating operation of the hybrid switched capacitor converter during a second portion of the control cycle according to embodiments herein.

3. $t_2$-$t_3$: at $t=t_2$, switches $Q_2$, $Q_4$, $Q_6$ and $Q_7$ are turned ON with zero voltage switching, switches Q1, Q3, Q5, and Q8 are OFF. After $t=t_2$ the resonant transition takes place between $C_{res1}$ and the leakage inductance of the multi-tapped autotransformer, whilst the second resonant mode transition takes place between $C_{res2}$ and the leakage inductance of the multi-tapped autotransformer. Similar to phase 1 ($t_0$-$t_1$), but differently $C_{res1}$ is soft-charged from the input voltage source $V_{in}$ whilst $C_{res1}$ is soft-discharged. The topological state is shown in FIG. 15. Similarly to phase 1 ($t_0$-$t_1$), the current dependence in the transformer 160 can be defined as follows: considering perfect balanced between the actual resonant current through $C_{res1}$ and $C_{res2}$ $i_{C_{res1}}(t)=-i_{C_{res2}}(t)$ and considering $i_{C_{res2}}(t)=i_{res}(t)$ it follows that $i_{s_1}(t)=2i_{res}(t)$. In this scenario the following equation are valid in this phase:

$$-N_1 i_{res}(t) - N_1 i_{res}(t) = N_2 i_{s_1}(t) - N_2 i_{s_2}(t) \quad \text{(equation 19)}$$

which can be written as:

$$i_{s_2}(t) = \left(\frac{2N_1}{N_2}+2\right)i_{res}(t) \quad \text{(equation 20)}$$

Figure 16:
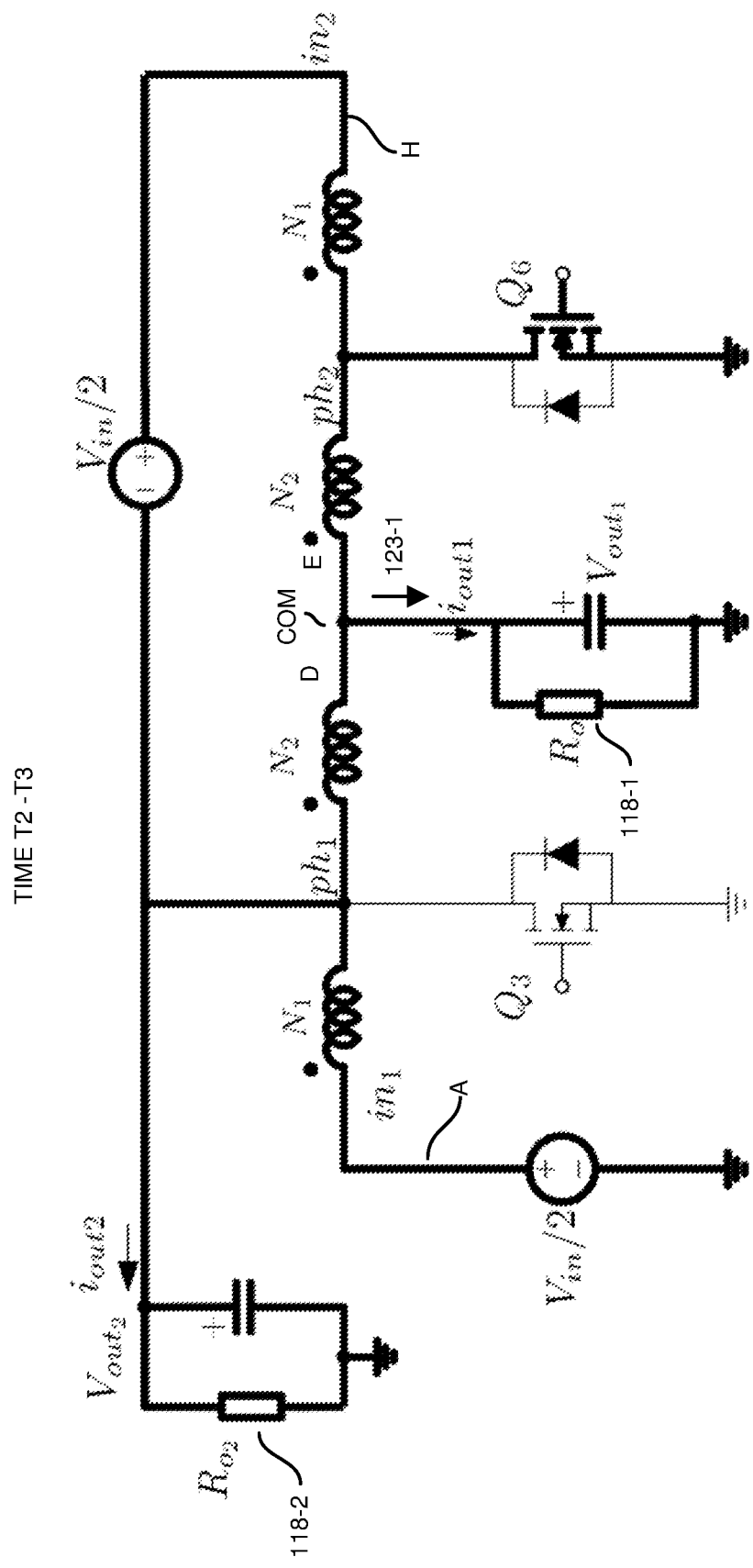
FIG. 16 is an example diagram illustrating an equivalent circuit operation of the hybrid switched capacitor converter in the second portion of a control cycle according to embodiments herein.

FIG. 16 is an example diagram illustrating an equivalent circuit operation of the hybrid switched capacitor converter and a second portion of a control cycle according to embodiments herein.

During phase $t_2$-$t_3$ both rails $V_{out_1}$ and $V_{out_2}$ are powered as shown in the equivalent circuit reported in FIG. 16. During phase $t_2$-$t_3$, rail $V_{out_2}$ is powered from the drain of $Q_7$ and the source of $Q_2$, however part of the current flowing into $C_{res1}$ drain $Q_5$ is also flowing to rail $V_{out_1}$ as reported in FIG. 12 and FIG. 13. This is an example how this converter is capable of simultaneously producing output voltage 123-1 and output voltage 123-2 as two unregulated rails in parallel.

1. $t_3$-$t_4$: at $t=t_3$ switches $Q_2$, $Q_4$, $Q_6$ and $Q_7$ are turned off and the parasitic capacitance of $Q_4$ are charged to $$V_{in}\left(\frac{1+\frac{N_1}{N_2}}{2+\frac{N_1}{N_2}}\right),$$

$Q_6$ is charged to $2V_{out1}$, $Q_2$ is charged to $$V_{in}\left(\frac{1+\frac{N_1}{N_2}}{2+\frac{N_1}{N_2}}\right),$$

$Q_7$ is charged to $2V_{out1}$, whilst the parasitic capacitance of $Q_1$, $Q_3$, $Q_5$ and $Q_8$ are discharged to zero. When the capacitance of $Q_1$, $Q_3$, $Q_5$ and $Q_8$ are discharged to zero their body diodes start to conduct to enable ZVS turn on. The topological state is shown in FIG. 14. The current that enables ZVS is $i_{L_{zvs}}(t_3)$ which correspond with $-i_{L_{zvs,pk}}$. Thus $i_{L_{zvs,pk}}$ is a good index to establish when ZVS condition is achieved for all switches. At $t=t_4$ switches $Q_1$, $Q_3$, $Q_5$ and $Q_8$ are turned on in ZVS which correspond with one-cycle of the switching period $T_{sw}$.

In this section were shown the main conversion operations from where it is possible to get that the converter is powered from the input voltage $V_{in}$ for almost the entire switching cycle $T_{sw}$, therefore the converter shown in FIG. 5 and FIG. 6 are an example of the generalized circuit shown in FIG. 3 where a dual phase resonant converter is a characteristic of the circuit.

As previously mentioned, the voltage converter 135 and switched-capacitor converter 131 as discussed herein can be configured to include any number of resonant circuit paths. For example, in one embodiment, the switched-capacitor converter 131 includes a first resonant circuit path (such as capacitor Cres1 and winding 161-2) and a second resonant circuit path (such as capacitor Cres2 and winding 161-1).

As discussed above, with reference to FIG. 5, and in accordance with control signals applied in FIG. 10, the controller 140 performs: i) while switch Q8 is OFF, switching of switch Q7 to an ON state to electrically couple a first resonant circuit path such as capacitor Cres2 and winding 161-1 as well as winding 162-1 of the switched-capacitor converter to the output 133-2 at time between T0 and T1, and ii) while switch Q7 is OFF, switching of switch Q8 to an ON state to electrically couple a second resonant circuit path such as capacitor Cres 1 and winding 161-2 and winding 162-2 of the switched-capacitor converter to the output 133-1 at time between T2 and T3.

Both the first resonant circuit path and the second resonant circuit path contribute to generation of the first output voltage 123-1; both the first resonant circuit path and the second resonant circuit path contribute to generation of the second output voltage 123-2.

In still further example embodiments, with reference to FIGS. 5 and 10, the controller 140 switches between connecting node 213 of the first resonant circuit path (such as at terminal end of capacitor Cres1) between the voltage source supplying the input voltage 120 and the output 133-2. More specifically, between time T0 and T1, the controller 140 activates switch Q1 to an ON state and deactivates switch Q2 to an OFF state. This connects node 213 of the first resonant circuit path to the input voltage source supplying input voltage 120. Between time T2 and T3, the controller 140 activates switch Q2 to an ON state and deactivates switch Q1 to an OFF state. This connects node 213 of the first resonant circuit path to the output 133-2.

In an opposite manner, the controller 140 controls the second resonant circuit path. For example, with reference again to FIGS. 5 and 10, the controller 140 switches between coupling node 214 of the second resonant circuit path (such as node 214 or terminal end of capacitor Cres2) between the input voltage 120 and the output 133-2. More specifically, between time T0 and T1, the controller 140 activates switch Q5 to an ON state and deactivates switch Q4 to an OFF state. This connects node 214 of the second resonant circuit path to the output 133-2. Between time T2 and T3, the controller 140 activates switch Q4 to an ON state and deactivates switch Q5 to an OFF state. This connects node 214 of the second resonant circuit path to the voltage source producing input voltage 120.

Figure 17:
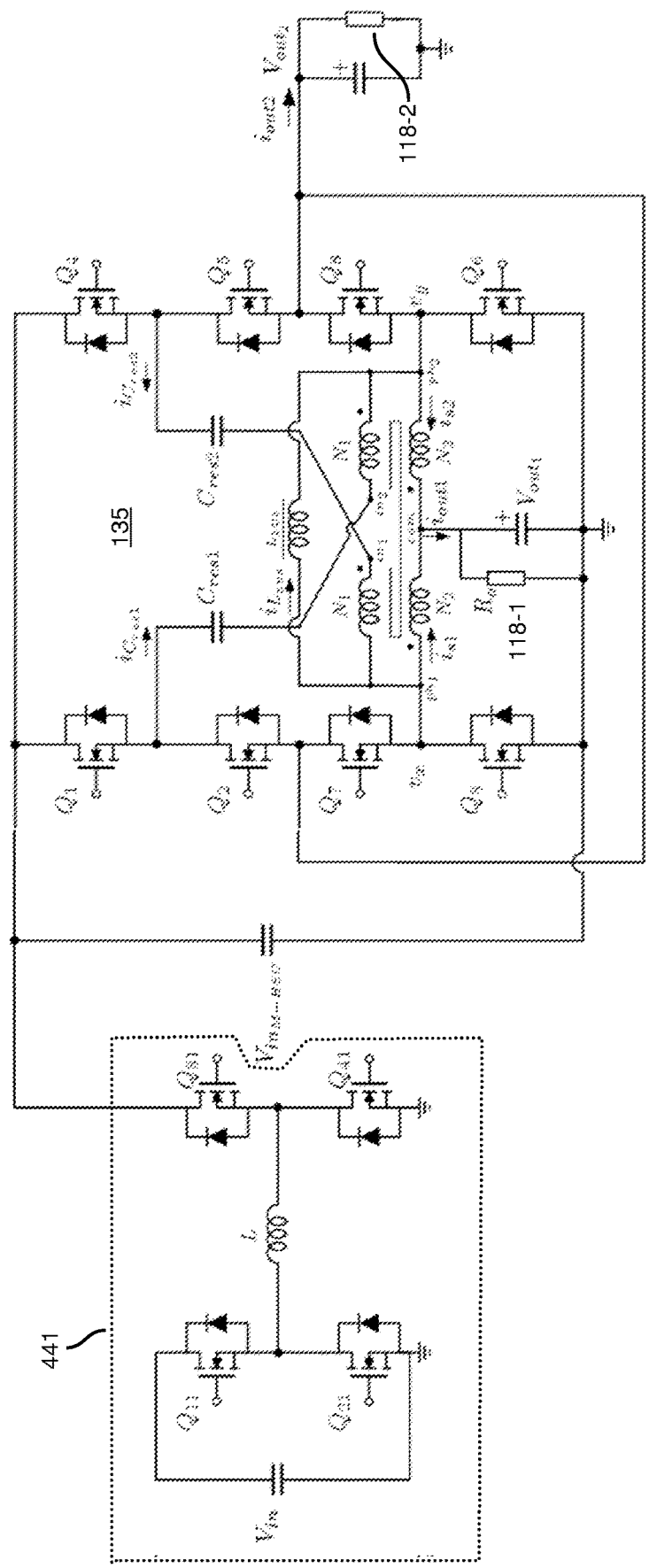
FIG. 17 is an example diagram illustrating a multistage power supply including a hybrid switched capacitor converter according to embodiments herein.

FIG. 17 is an example diagram illustrating a multistage power supply including a hybrid switched capacitor converter according to embodiments herein.

As shown in this example embodiment, similar to FIG. 4, the power supply in FIG. 17 as discussed herein can include a non-inverting buck-boost converter (first stage 441) and the voltage converter 135 (such as Multi-Rail Hybrid Switched capacitor) as second stage supplying two rail voltages including output voltage 123-1 and output voltage 123-2.

In one embodiment, as shown in FIG. 17, an example of a possible power architecture shown in FIG. 4, where the first stage 441 is a non-inverting buck boost from an input voltage $V_{in}$ (i.e. from a bus rail 48-V) regulating the input of $V_{in_{M-HSC}}$. The regulation of the input voltage $V_{in_{M-HSC}}$ is shown in FIG. 4, where the buck-boost (first stage 441) is regulated by sensing the output voltage $V_{out_1}$, and as demonstrated in the output voltage $V_{out_2}$ is semi-regulated/regulated, where the maximum voltage error, considering equation 8, is given by the following equation:

$$\Delta V_{out_2,max}(I_{out1}, I_{out2}) \simeq \qquad \text{(equation 21)}$$
$$\max\left(I_{out2} * R_{out2}(I_{out1}) * \frac{n_2}{n_1}\right) - \min(I_{out1} * R_{out1}(I_{out2}))$$

By regulating the magnitude of the input voltage 120 of M-HSC, in order to regulate one of the two output rail voltages such as output voltage 123-1 or output voltage 123-2, for example $V_{out_1}$, and considering the demonstration given in FIG. 4 and corresponding description, the output voltage $V_{out_2}$ is getting regulated as well if the maximum voltage error deviation reported in equation 21 is allowed from the load specification connected to $V_{out_2}$.

Figure 18:
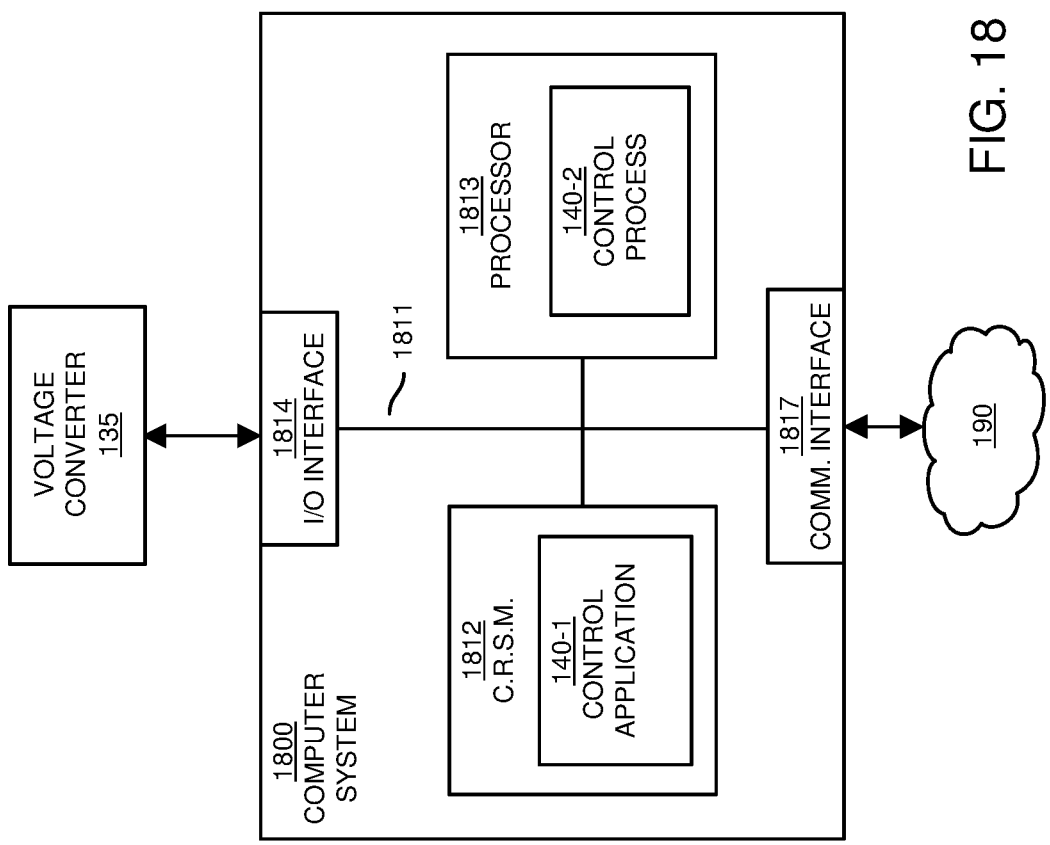
FIG. 18 is an example diagram illustrating computer architecture operable to execute one or more operations according to embodiments herein.

FIG. 18 is an example block diagram of a computer system for implementing any of the operations as previously discussed according to embodiments herein.

Any of the resources (such as controller 140, etc.) as discussed herein can be configured to include computer processor hardware and/or corresponding executable instructions to carry out the different operations as discussed herein.

As shown, computer system 1850 of the present example includes an interconnect 1811 that provides coupling of computer readable storage media 1812 such as a non-transitory type of media (which can be any suitable type of hardware storage medium in which digital information can be stored and retrieved), a processor 1813 (computer processor hardware), I/O interface 1814, and a communications interface 1817.

I/O interface(s) 1814 supports connectivity to repository 1880 and input resource 1892. Computer readable storage medium 1812 can be any hardware storage device such as memory, optical storage, hard drive, floppy disk, etc. In one embodiment, the computer readable storage medium 1812 stores instructions and/or data.

As shown, computer readable storage media 1812 can be encoded with controller application 140-1 (e.g., including instructions) to carry out any of the operations as discussed herein.

During operation of one embodiment, processor 1813 accesses computer readable storage media 1812 via the use of interconnect 1811 in order to launch, run, execute, interpret or otherwise perform the instructions in controller application 140-1 stored on computer readable storage medium 1812. Execution of the controller application 140-1 produces controller process 140-2 to carry out any of the operations and/or processes as discussed herein.

Those skilled in the art will understand that the computer system 1850 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1850 may reside at any location or can be included in any suitable resource in any network environment to implement functionality as discussed herein.

Functionality supported by the different resources will now be discussed via flowchart in FIG. 19. Note that the steps in the flowcharts below can be executed in any suitable order.

Figure 19:
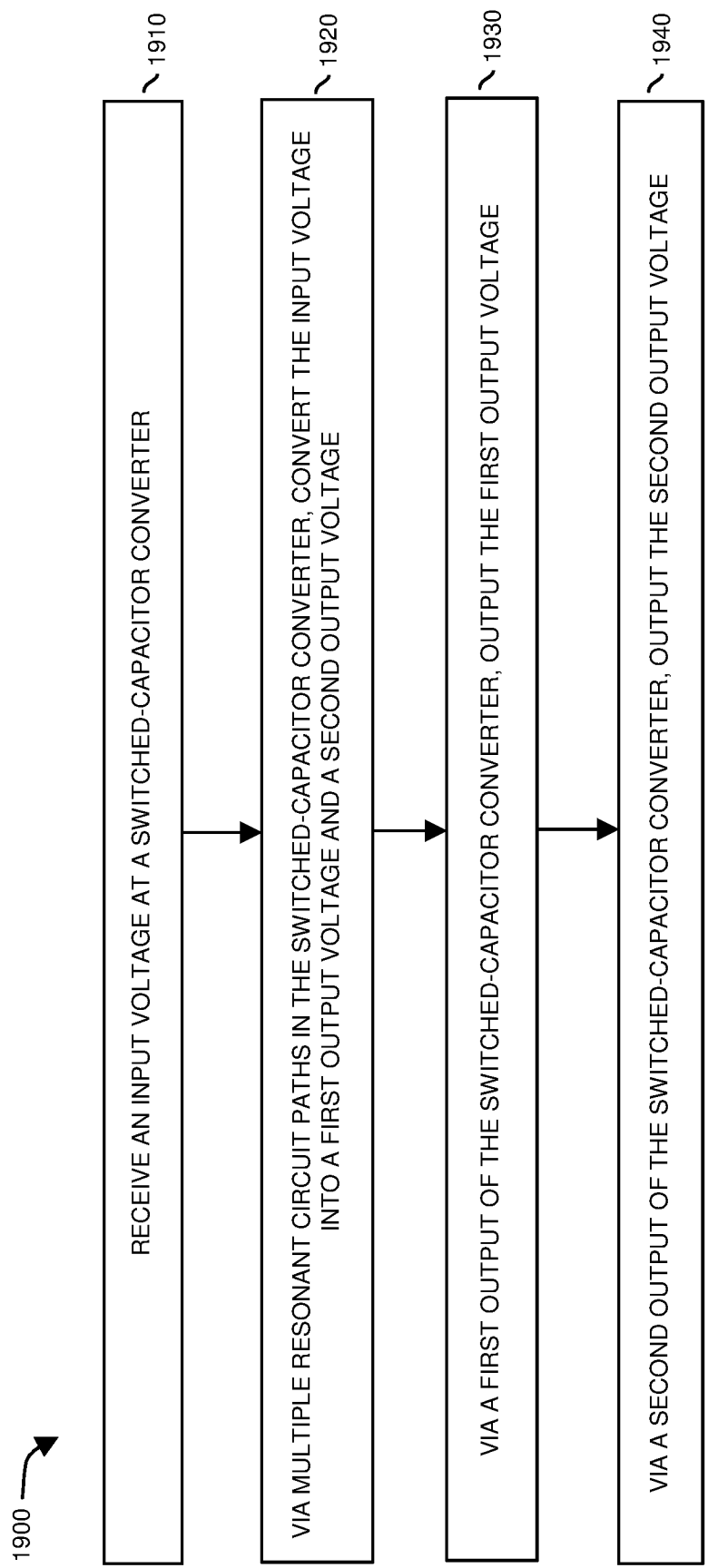
FIG. 19 is an example diagram illustrating a general method according to embodiments herein.

FIG. 19 is a flowchart 1900 illustrating an example method according to embodiments herein. Note that there will be some overlap with respect to concepts as discussed above.

In processing operation 1910, via controlled switching of multiple resonant circuit paths in a switched-capacitor converter 131, the switched-capacitor converter 131 converts a received input voltage 120 into a first output voltage 123-1 and a second output voltage 123-2.

In processing operation 1920, a first output 133-1 of the switched-capacitor converter 131 outputs the first output voltage 123-1.

In processing operation 1930, a second output 133-2 of the switched-capacitor converter 131 outputs the second output voltage.

Figure 20:
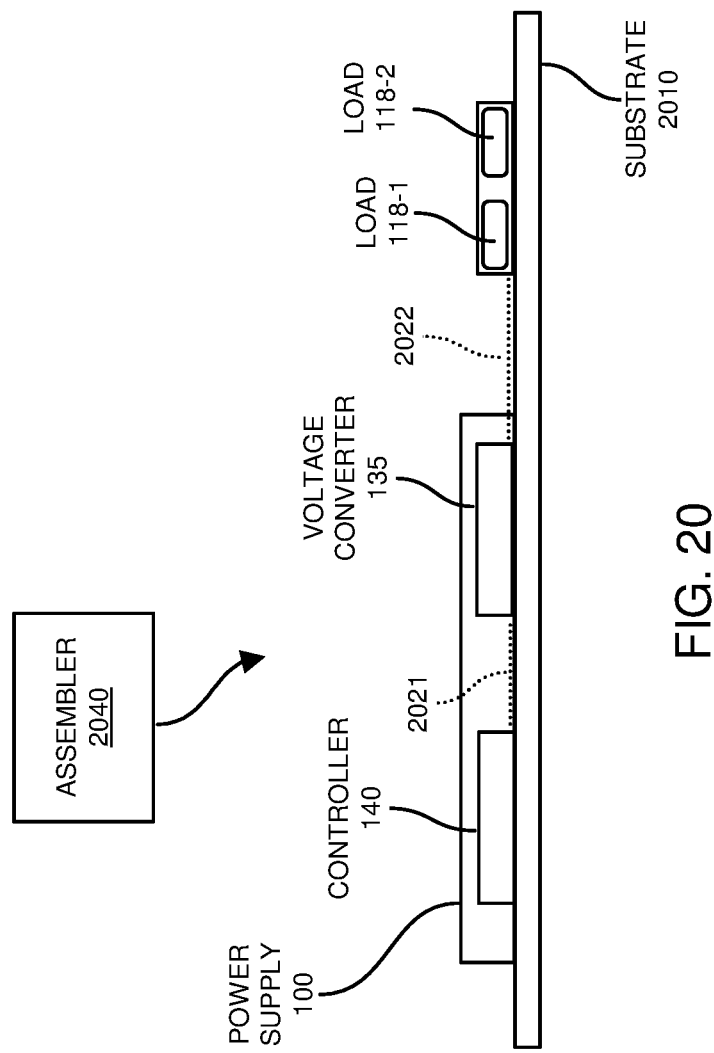
FIG. 20 is an example diagram illustrating assembly of a power converter circuit on a circuit board according to embodiments herein.

FIG. 20 is an example diagram illustrating assembly of a power converter circuit on a circuit board according to embodiments herein.

In this example embodiment, assembler 2040 receives a substrate 2010 (such as a circuit board).

The assembler 1040 further affixes (couples) the controller 140 and voltage converter 135 and corresponding components to the substrate 2010.

Via circuit paths 2021 (such as one or more traces, electrical conductors, cables, wires, etc.), the assembler 2040 couples the controller 140 to the voltage converter 135. Note that components such as the controller 140, voltage converter 135, and corresponding components can be affixed or coupled to the substrate 2010 in any suitable manner. For example, one or more of the components in power supply 100 can be soldered to the substrate, inserted into sockets on the substrate 2010, etc.

Note further that the substrate 2010 is optional. Circuit paths 2022 may be disposed in cables providing connectivity between the voltage converter 135 and the load 118.

In one nonlimiting example embodiment, the load 118 is disposed on its own substrate independent of substrate 2010; the substrate of the load 118 is directly or indirectly connected to the substrate 2010. The controller 140 or any portion of the power converter 135 can be disposed on a standalone smaller board plugged into a socket of the substrate 2010.

Via one or more circuit paths 2022 (such as one or more traces, cables, connectors, wires, conductors, electrically conductive paths, etc.), the assembler 2040 couples the voltage converter 135 to the load 118. In one embodiment, first traces of the circuit path 2022 convey the output voltage 123-1 generated from the voltage converter 135 to the load 118-1. Second traces of the circuit path 2022 conveys the output voltage 123-2 generated from the voltage converter 135 to the load 118-2.

Accordingly, embodiments herein include a system comprising: a substrate 2010 (such as a circuit board, standalone board, mother board, standalone board destined to be coupled to a mother board, host, etc.); a voltage converter 135 including corresponding components as described herein; and loads 118-1 and 118-2. As previously discussed, the loads 118 are powered based on conveyance of output voltages 123 and corresponding current conveyed over one or more circuit paths 2022 from the voltage converter 135 to the loads 118.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1010 or disposed at a remote location.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a switched-capacitor converter operative to receive an input voltage, the switched-capacitor converter including multiple resonant circuit paths to convert the input voltage into a first output voltage and a second output voltage;
a first output operative to output the first output voltage;
a second output operative to output the second output voltage; and
wherein the switched-capacitor converter includes a transformer, the transformer including multiple windings to convert the input voltage into the first output voltage and the second output voltage.

2. The apparatus as in claim 1, wherein a magnitude of the first output voltage is regulated; and
wherein a magnitude of the second output voltage is proportional to the magnitude of the first output voltage and is controlled based at least in part on regulation of the first output voltage.

3. The apparatus as in claim 1, wherein switches in the switched-capacitor converter are controlled to draw power from the input voltage for greater than 50% of a duty cycle of controlling the switches in the switched-capacitor converter to produce the first output voltage and the second output voltage.

4. The apparatus as in claim 1, wherein a turn ratio associated with the multiple windings in the transformer controls a magnitude of the first output voltage with respect to a magnitude of the second output voltage.

5. The apparatus as in claim 1, wherein the multiple resonant circuit paths include a first resonant circuit path and a second resonant circuit path;
wherein the transformer includes a first winding and a second winding;
wherein the first resonant circuit path includes a first capacitor and the first winding of the transformer; and
wherein the second resonant circuit path includes a second capacitor and the second winding of the transformer.

6. The apparatus as in claim 5, wherein the first winding is inductively coupled to the second winding.

7. The apparatus as in claim 1, wherein the multiple resonant circuit paths include a first resonant circuit path and a second resonant circuit path;
wherein the first resonant circuit path and the second resonant circuit path contribute to generation of the first output voltage; and
wherein the first resonant circuit path and the second resonant circuit path contribute to generation of the second output voltage.

8. The apparatus as in claim 1 further comprising:
a controller operative to control a magnitude of the input voltage based on comparison of the first output voltage to a setpoint value.

9. The apparatus as in claim 1, wherein the transformer is a multi-tapped autotransformer; and
wherein resonant frequencies of the multiple resonant circuit paths are defined by windings in the multi-tapped autotransformer.

10. A system comprising:
a circuit substrate; and
wherein the apparatus of claim 1 is affixed to the circuit substrate, the apparatus operative to: i) power a first load via the first output voltage, and ii) power a second load via the second output voltage.

11. A method comprising:
receiving a circuit substrate; and
fabricating the apparatus of claim 1 on the circuit substrate.

12. An apparatus comprising:
a switched-capacitor converter operative to receive an input voltage, the switched-capacitor converter including multiple resonant circuit paths to convert the input voltage into a first output voltage and a second output voltage;
a first output operative to output the first output voltage;
a second output operative to output the second output voltage, the apparatus further comprising:
a first switch operative to electrically couple a first resonant circuit path and windings of the switched-capacitor converter to the second output; and
a second switch operative to electrically couple a second resonant circuit path and windings of the switched-capacitor converter to the second output.

13. The apparatus as in claim 12, wherein a magnitude of the first output voltage is regulated; and
wherein a magnitude of the second output voltage is proportional to the magnitude of the first output voltage and is controlled based at least in part on regulation of the first output voltage.

14. The apparatus as in claim 12, wherein switches in the switched-capacitor converter are controlled to draw power from the input voltage for greater than 50% of a duty cycle.

15. The apparatus as in claim 1, wherein the switched-capacitor converter includes a transformer, the transformer including multiple windings to convert the input voltage into the first output voltage and the second output voltage.

16. The apparatus as in claim 15, wherein a turn ratio associated with the multiple windings in the transformer controls a magnitude of the first output voltage with respect to a magnitude of the second output voltage.

17. The apparatus as in claim 12, wherein the switched-capacitor converter includes a transformer, the transformer including a first winding and a second winding;
wherein the first resonant circuit path includes a first capacitor and the first winding of the transformer; and
wherein the second resonant circuit path includes a second capacitor and the second winding of the transformer.

18. The apparatus as in claim 17, wherein the first winding is inductively coupled to the second winding.

19. The apparatus as in claim 12, wherein the first resonant circuit path and the second resonant circuit path contribute to generation of the first output voltage; and
wherein the first resonant circuit path and the second resonant circuit path contribute to generation of the second output voltage.

20. The apparatus as in claim 12 further comprising:
a controller operative to control a magnitude of the input voltage based on comparison of the first output voltage to a setpoint value.

21. An apparatus comprising:
a switched-capacitor converter operative to receive an input voltage, the switched-capacitor converter including multiple resonant circuit paths to convert the input voltage into a first output voltage and a second output voltage;
a first output operative to output the first output voltage;
a second output operative to output the second output voltage, the apparatus further comprising:
a controller operative to switch between: i) coupling a node of a first resonant circuit path of the switched-capacitor converter between the input voltage and an output node that produces the second output voltage, and ii) coupling a node of a second resonant circuit path of the switched-capacitor converter between the input voltage and the output node that produces the second output voltage.

22. A method comprising:
at a switched-capacitor converter:
receive an input voltage;
via multiple resonant circuit paths in the switched-capacitor converter, convert the input voltage into a first output voltage and a second output voltage;
via a first output of the switched-capacitor converter, output the first output voltage;
via a second output of the switched-capacitor converter, output the second output voltage; and
wherein the switched-capacitor converter includes a transformer, the method further comprising:
controlling a flow of current through multiple windings of the transformer to convert the input voltage into the first output voltage and the second output voltage.

23. The method as in claim 22 further comprising:
regulating a magnitude of the first output voltage; and
controlling a magnitude of the second output voltage to be proportional to the magnitude of the first output voltage, the second output voltage controlled based at least in part on regulation of the first output voltage.

24. The method as in claim 22 further comprising:
controlling switches in the switched-capacitor converter to draw power from the input voltage for greater than 50% of a duty cycle of controlling the switches in the switched-capacitor converter.

25. The method as in claim 22, wherein a turn ratio associated with the multiple windings in the transformer controls a magnitude of the first output voltage and a magnitude of the second output voltage.

26. The method as in claim 22, wherein the multiple resonant circuit paths include a first resonant circuit path and a second resonant circuit path;
wherein the transformer includes a first winding and a second winding;
wherein the first resonant circuit path includes a first capacitor and the first winding of the transformer; and
wherein the second resonant circuit path includes a second capacitor and the second winding of the transformer.

27. The method as in claim 26, wherein the first winding is inductively coupled to the second winding.

28. The method as in claim 22 further comprising:
controlling operation of a first switch to electrically couple a first resonant circuit path and windings of the switched-capacitor converter to the second output; and
controlling operation of a second switch to electrically couple a second resonant circuit path and windings of the switched-capacitor converter to the second output.

29. The method as in claim 22, wherein the multiple resonant circuit paths include a first resonant circuit path and a second resonant circuit path;

generating the first output voltage via contribution of first current from the first resonant circuit path and the second resonant circuit path; and generating the second output voltage via contribution of second current from the first resonant circuit path and the second resonant circuit path.

30. The method as in claim 22 further comprising:

controlling a magnitude of the input voltage based on comparison of the first output voltage to a setpoint value.

31. The method as in claim 22, wherein the transformer is a multi-tapped autotransformer; and wherein resonant frequencies of the multiple resonant circuit paths are defined by windings in the multi-tapped autotransformer.

32. The method as in claim 22 further comprising:

switching between: i) coupling a node of a first resonant circuit path of the switched-capacitor converter between the input voltage and an output node that produces the second output voltage, and ii) coupling a node of a second resonant circuit path of the switched-capacitor converter between the input voltage and the output node that produces the second output voltage.

33. Computer-readable storage hardware having instructions stored thereon, the instructions, when carried out by computer processor hardware, cause the computer processor hardware to:

via controlled switching of multiple resonant circuit paths in a switched-capacitor converter including a transformer, convert a received input voltage into a first output voltage and a second output voltage;

via a first output of the switched-capacitor converter, output the first output voltage;

via a second output of the switched-capacitor converter, output the second output voltage; and controlling a flow of current through multiple windings of the transformer to convert the input voltage into the first output voltage and the second output voltage.

* * * * *